(12) United States Patent
Beswick et al.

(10) Patent No.: US 8,448,662 B1
(45) Date of Patent: *May 28, 2013

(54) HIGH INLET PRESSURE THREE-STAGE PRESSURE REGULATOR

(75) Inventors: Paul R. Beswick, Newington, NH (US); Gary A. Treadwell, Dover, NH (US)

(73) Assignee: The Paul R. Beswick 2008 Revocable Trust, Newington, NH (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/796,689

(22) Filed: Jun. 9, 2010

Related U.S. Application Data

(63) Continuation-in-part of application No. 11/999,941, filed on Dec. 7, 2007, now Pat. No. 8,087,428.

(60) Provisional application No. 60/873,870, filed on Dec. 7, 2006, provisional application No. 61/238,392, filed on Aug. 31, 2009.

(51) Int. Cl.
*F16K 31/12* (2006.01)

(52) U.S. Cl.
USPC .................................................. 137/505.12

(58) Field of Classification Search
USPC ............. 137/505.12, 505.18, 505.26, 505.27, 137/505.28, 505.29, 505.36, 505.37
See application file for complete search history.

(56) References Cited

U.S. PATENT DOCUMENTS

| | | | |
|---|---|---|---|
| 2,739,611 A | | 3/1956 | Cornelius |
| 3,722,536 A | | 3/1973 | Hill et al. ................. 137/505.46 |
| 4,182,368 A | | 1/1980 | Hartley .................... 137/596.17 |
| 5,113,898 A | | 5/1992 | White et al. ............... 137/454.5 |
| 5,411,053 A | * | 5/1995 | Markham et al. ........ 137/505.28 |
| 5,755,254 A | * | 5/1998 | Carter et al. .................. 137/340 |
| 5,797,425 A | * | 8/1998 | Carter et al. ............ 137/505.46 |
| 6,186,168 B1 | * | 2/2001 | Schultz et al. ........... 137/505.11 |

FOREIGN PATENT DOCUMENTS

| | | |
|---|---|---|
| GB | 708642 | 4/1952 |

* cited by examiner

*Primary Examiner* — Eric Keasel
*Assistant Examiner* — Reinaldo Sanchez-Medina
(74) *Attorney, Agent, or Firm* — Lorusso & Associates

(57) ABSTRACT

Two-stage and three-stage regulators having a piston situated in a first stage for substantially reducing high pressures introduced into the regulator. The reduced pressure from the first stage is exerted against a second-stage valve in a two-stage embodiment, and against an additional third-stage valve in a three-stage embodiment, each valve of which includes a plunger-actuated diaphragm that urges an actuator to open a ball valve at a selected pressure to allow fluid to flow out of the regulator at a desired and much-reduced pressure.

27 Claims, 22 Drawing Sheets

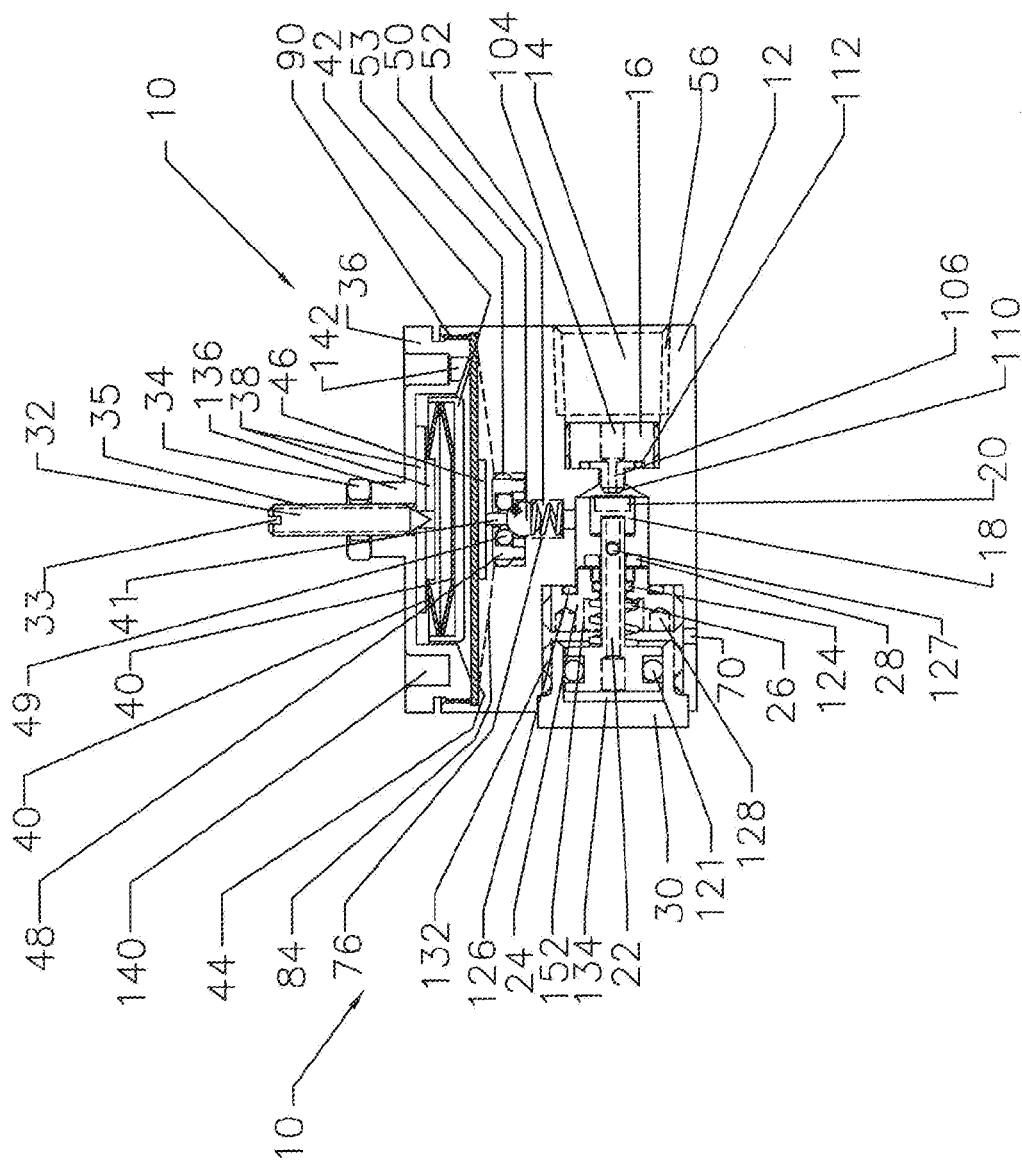

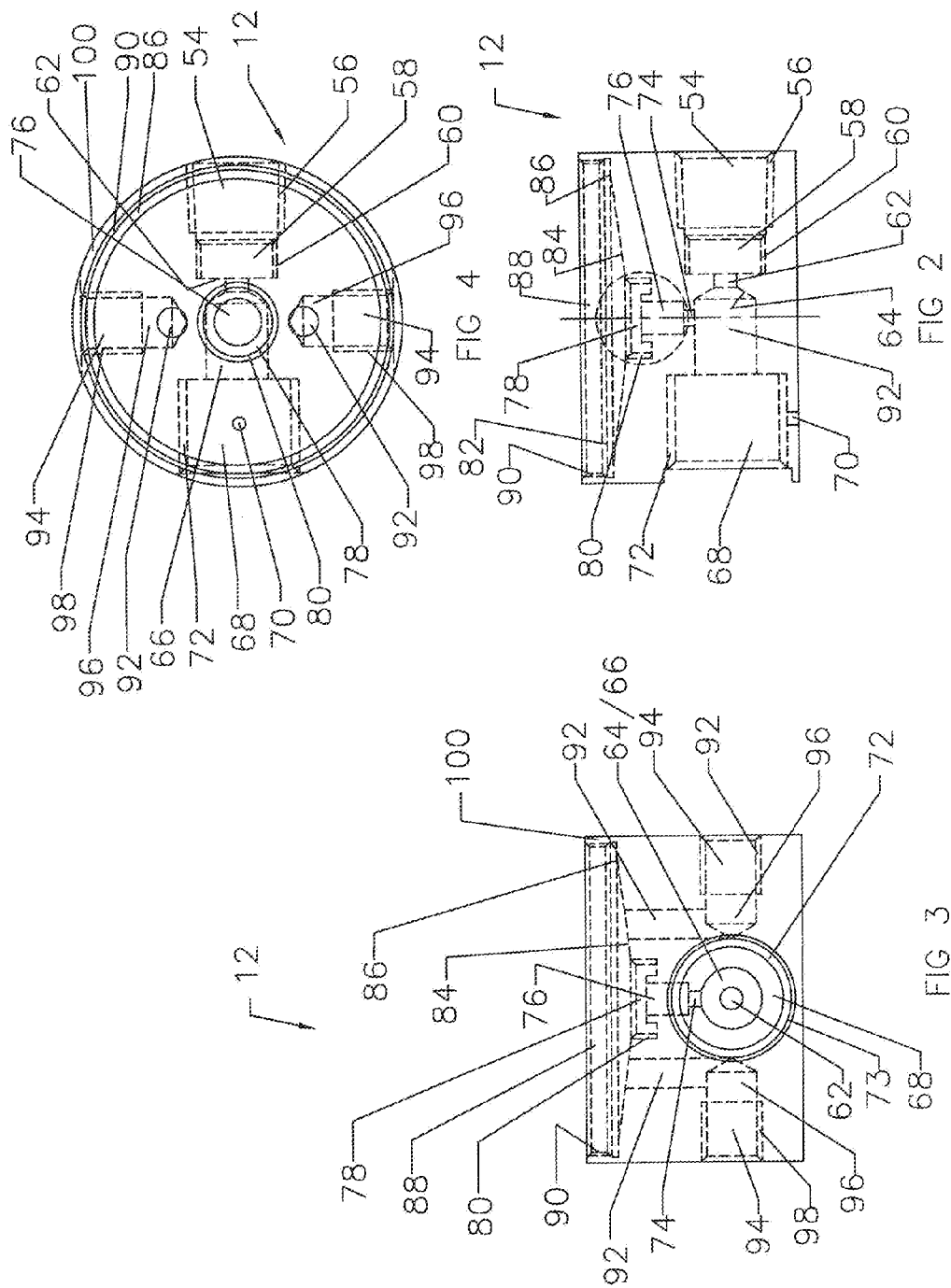

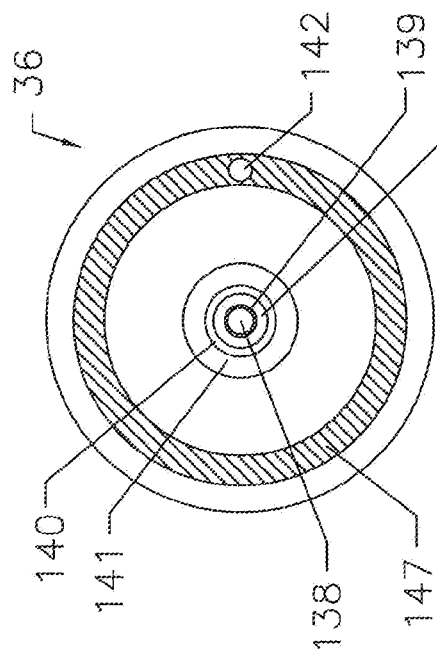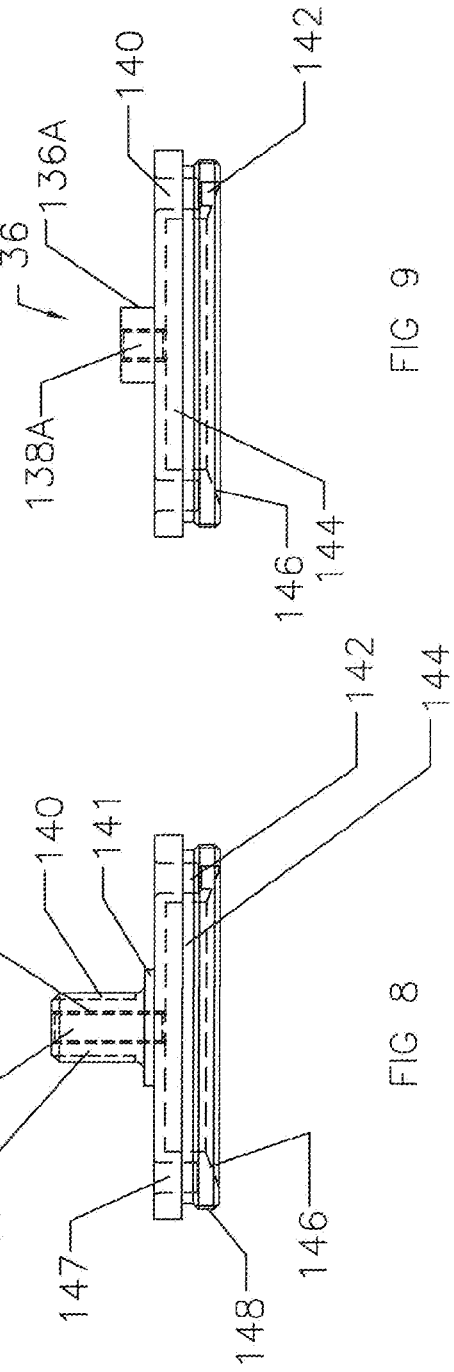

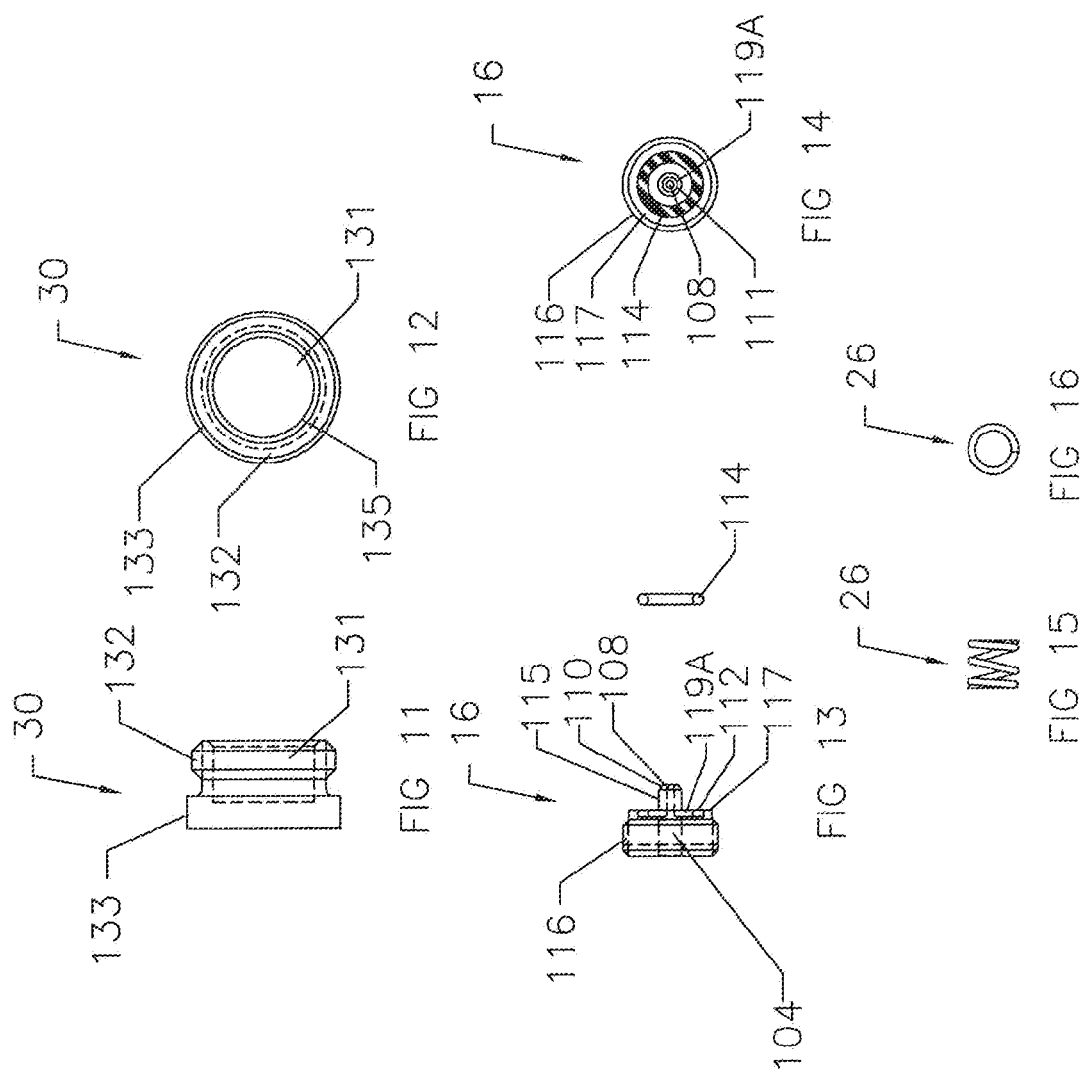

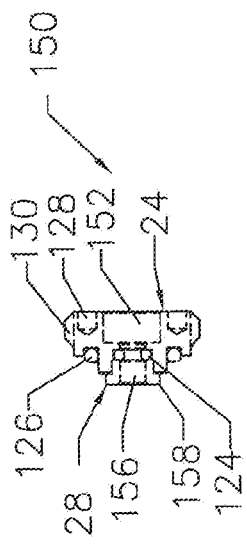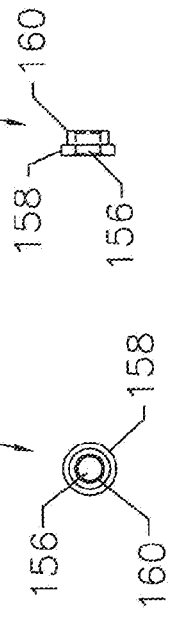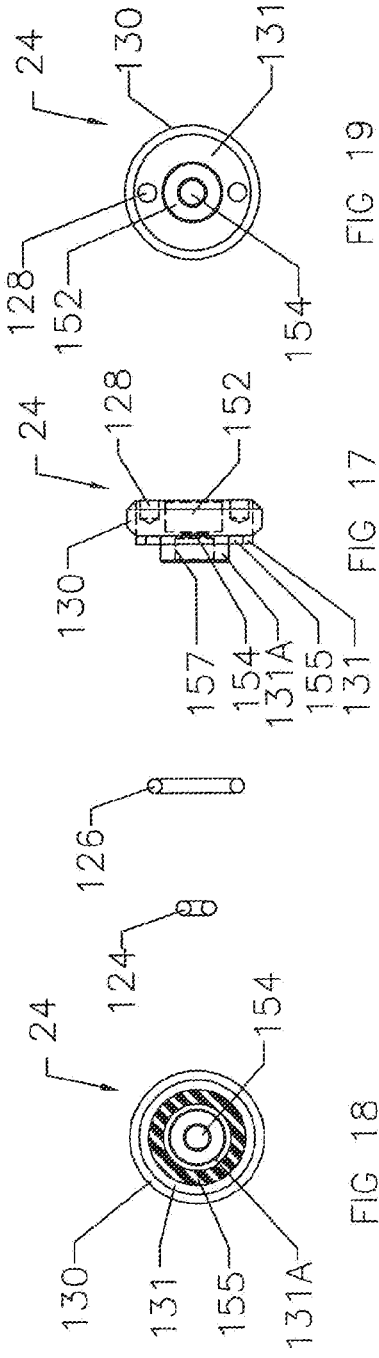

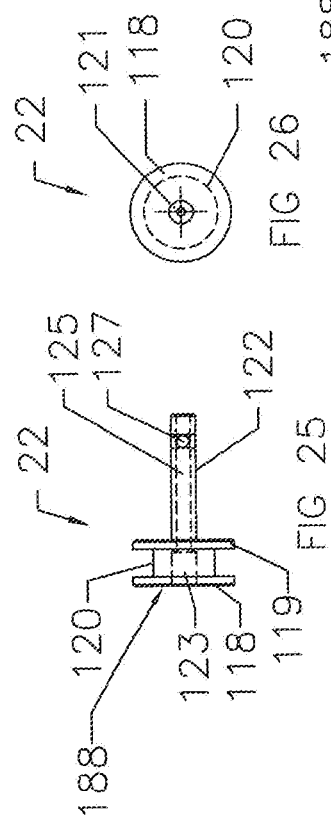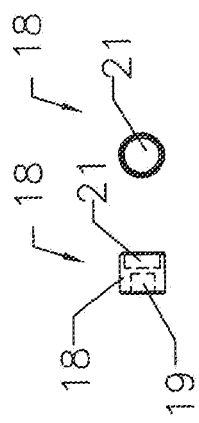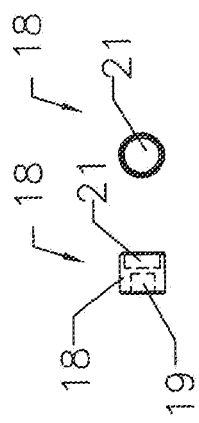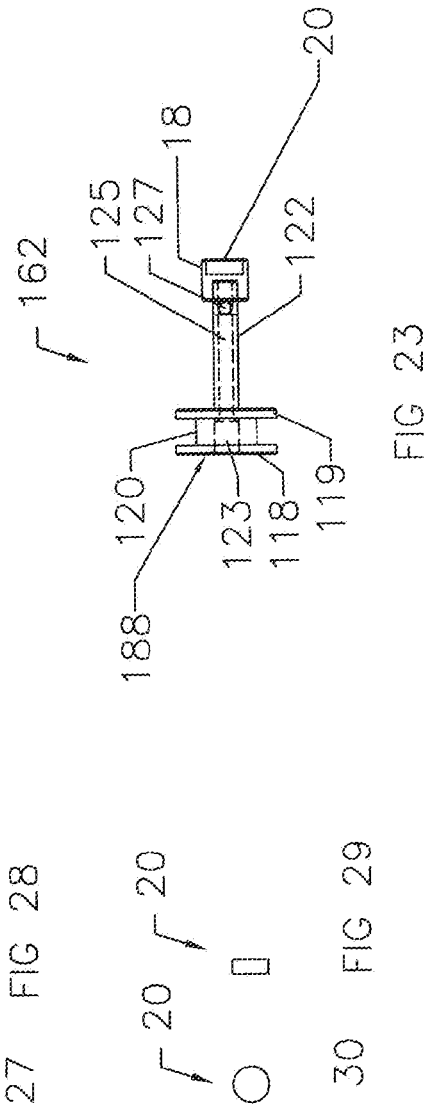

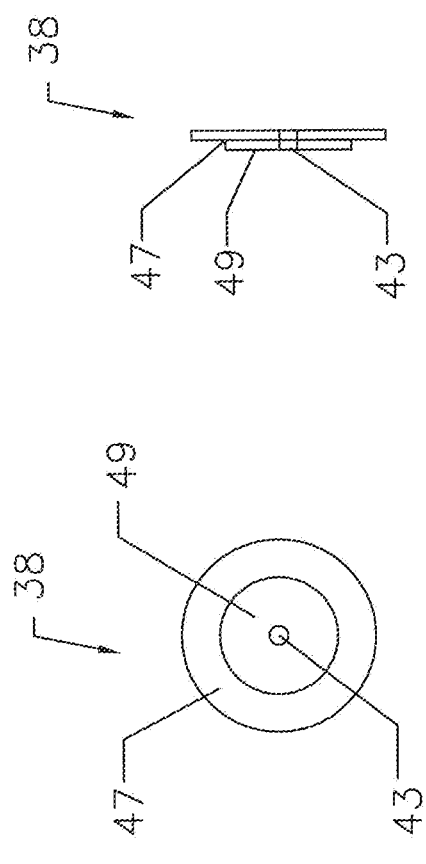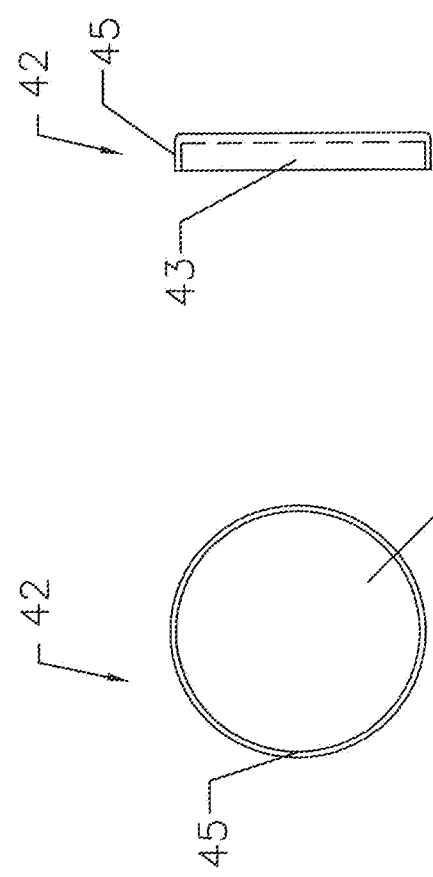

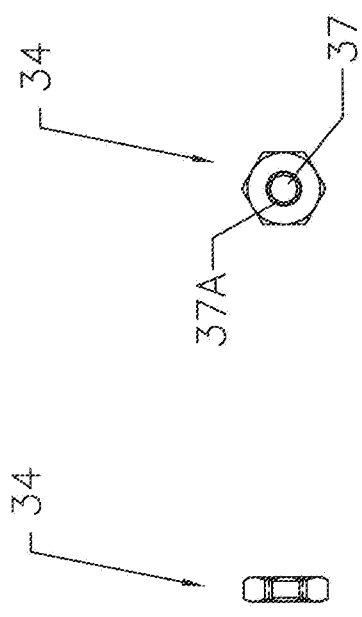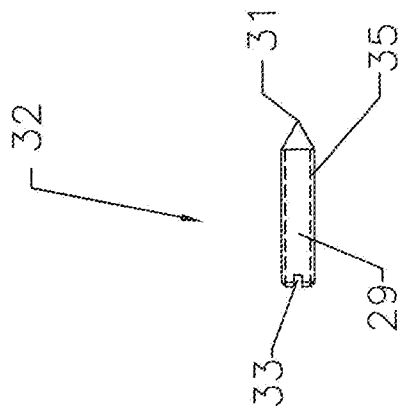

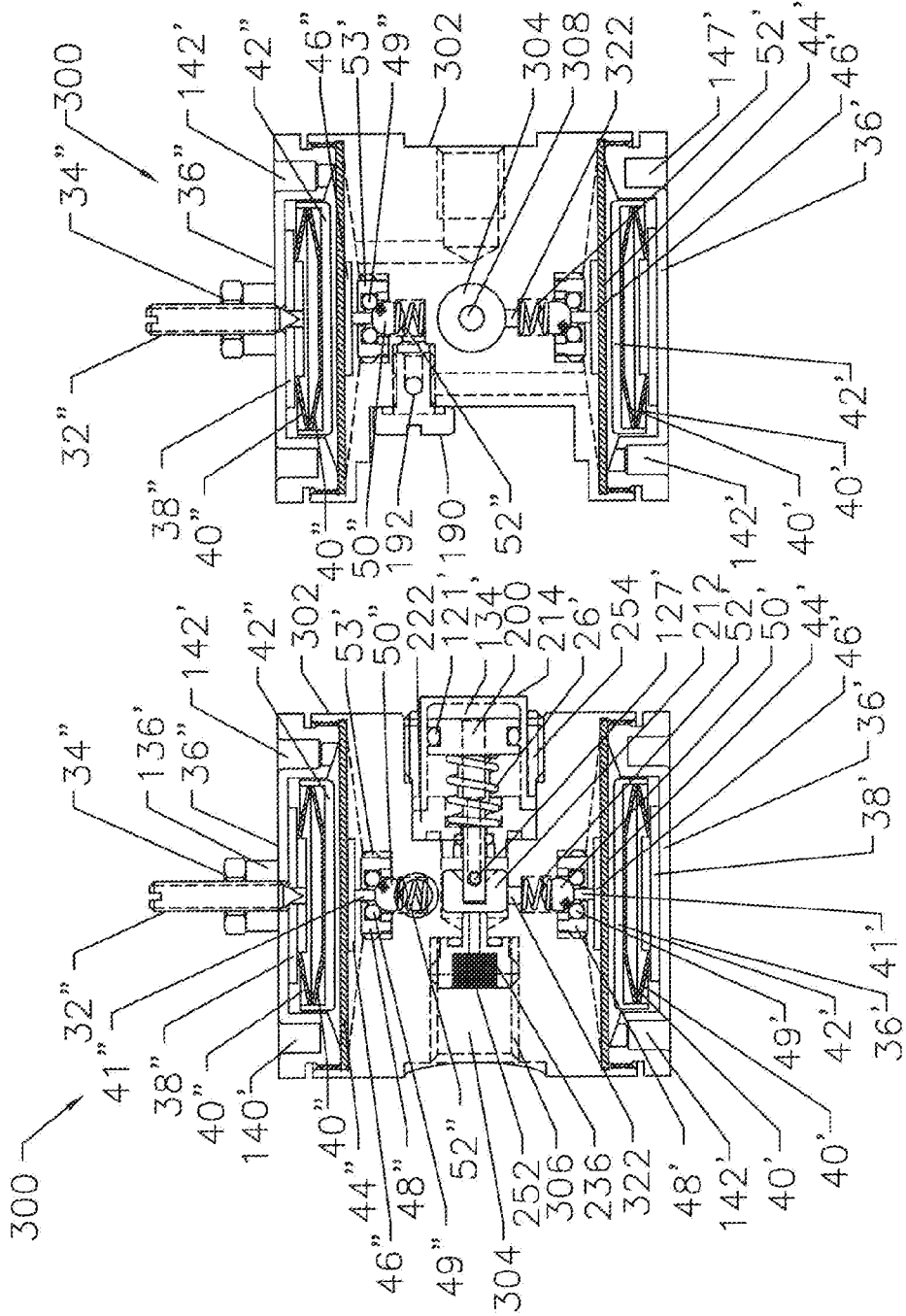

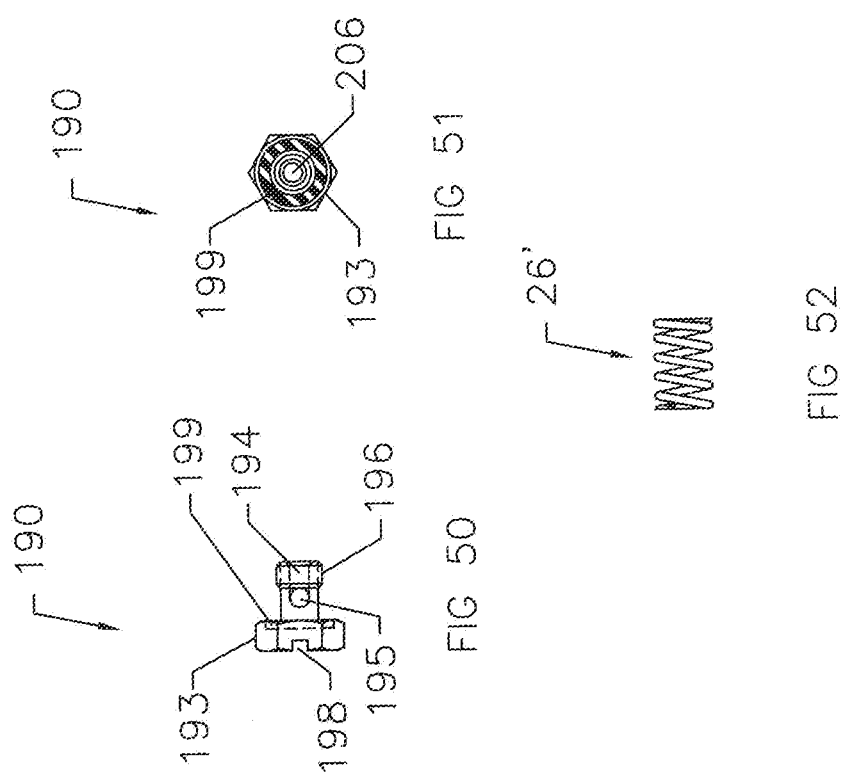

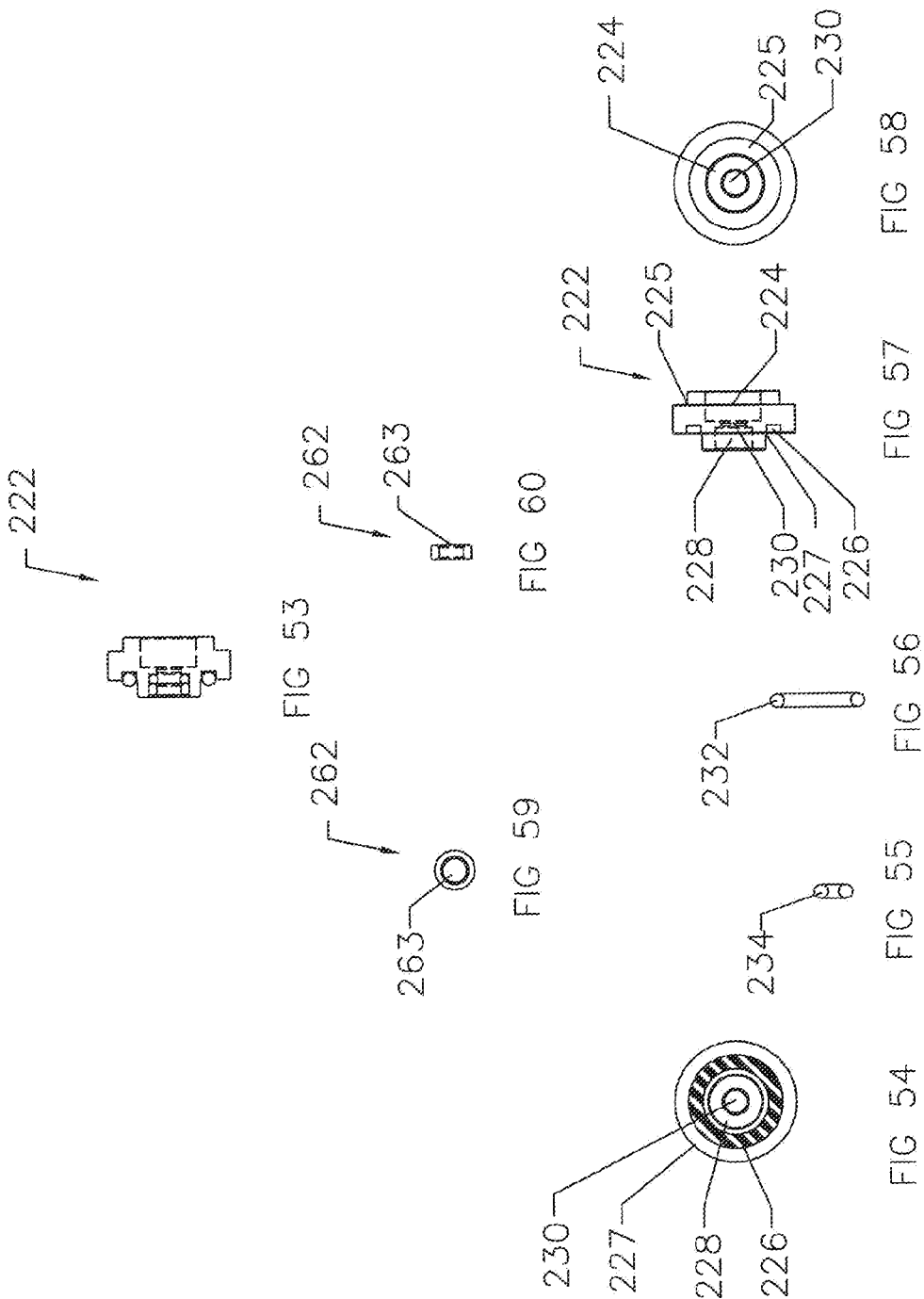

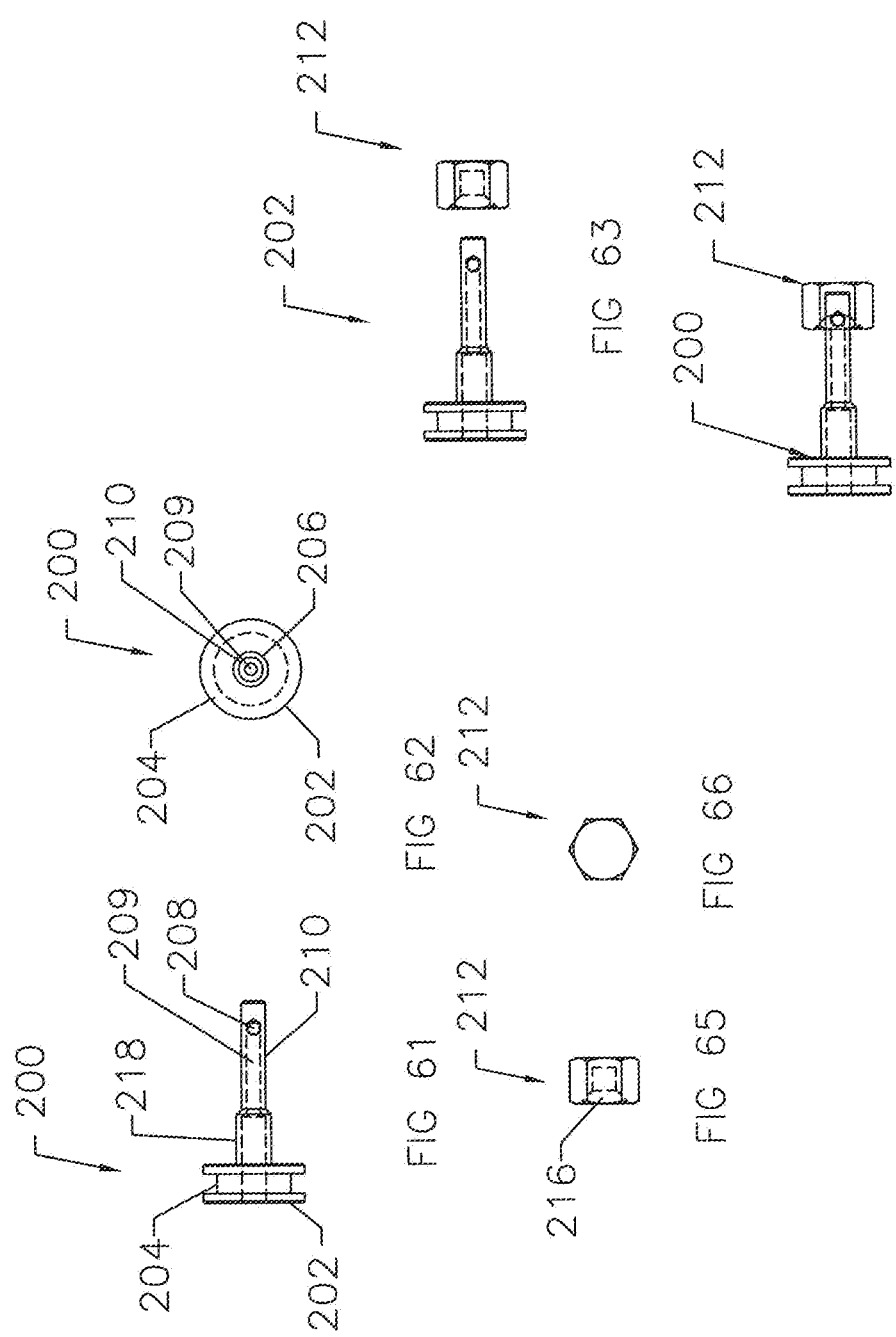

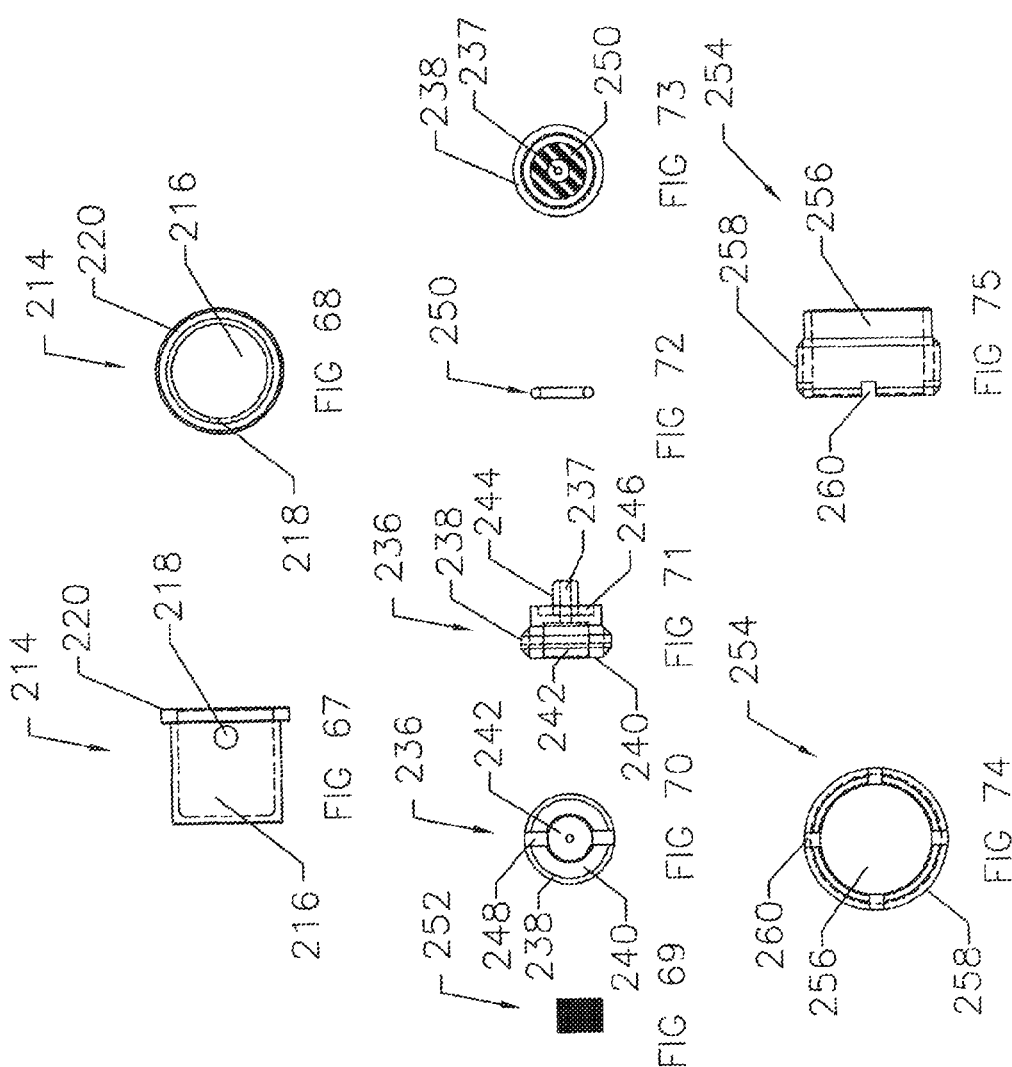

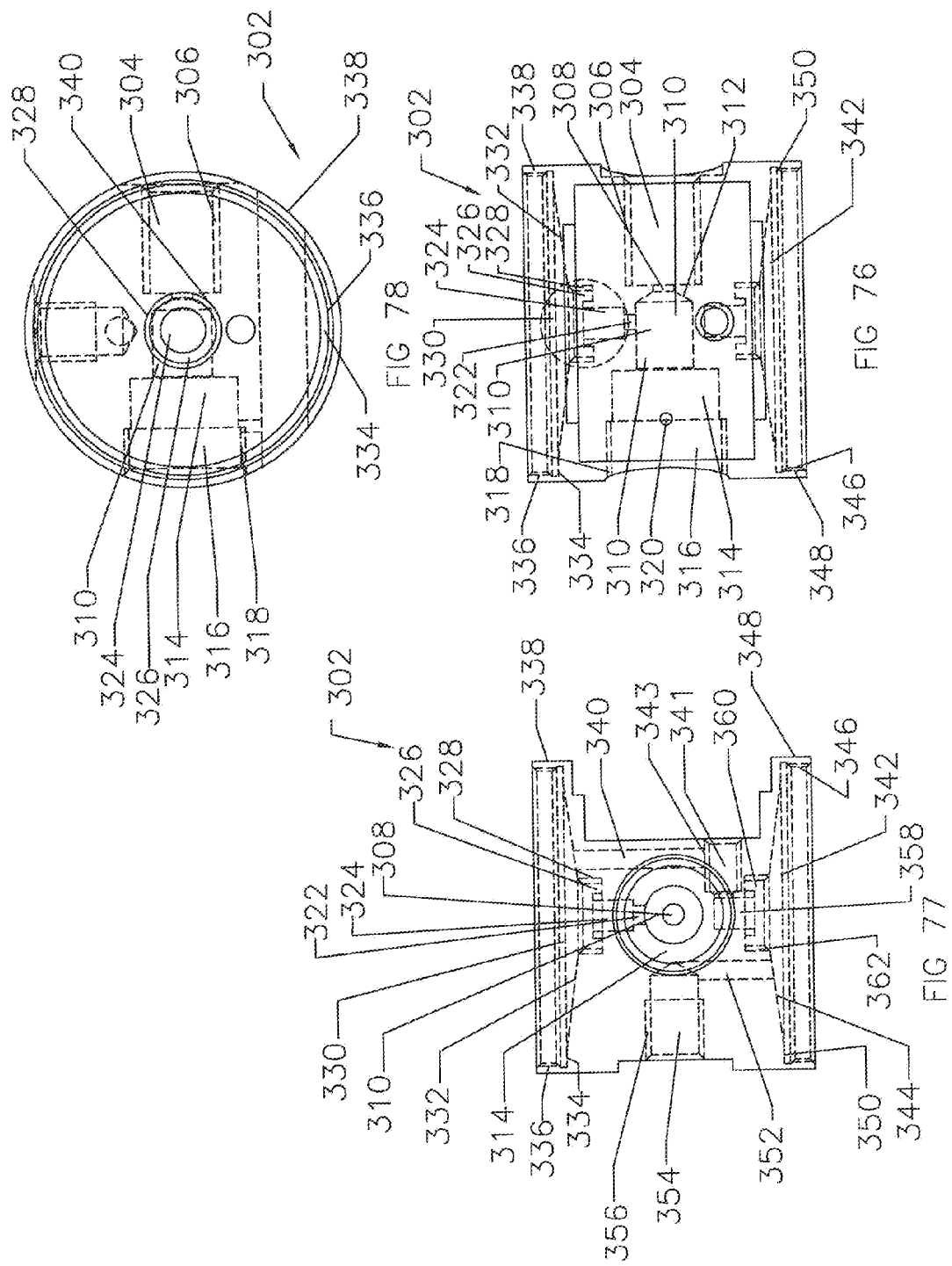

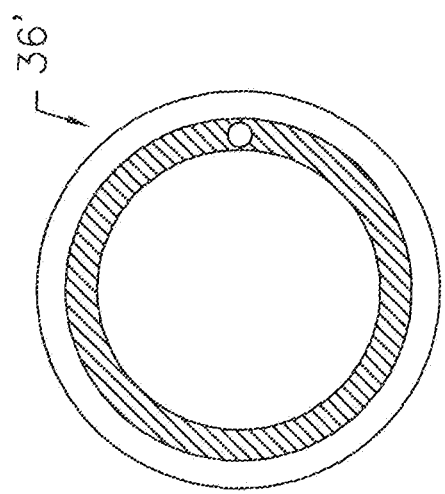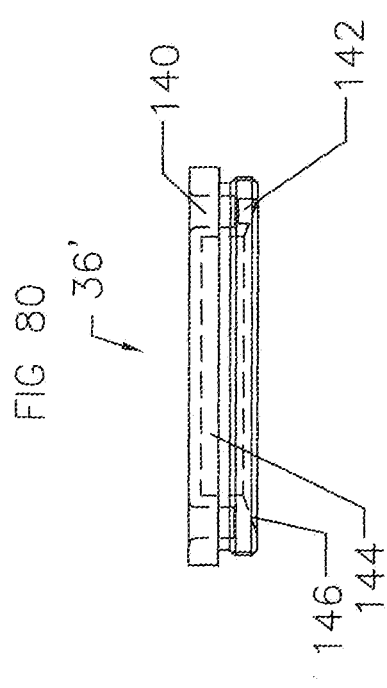

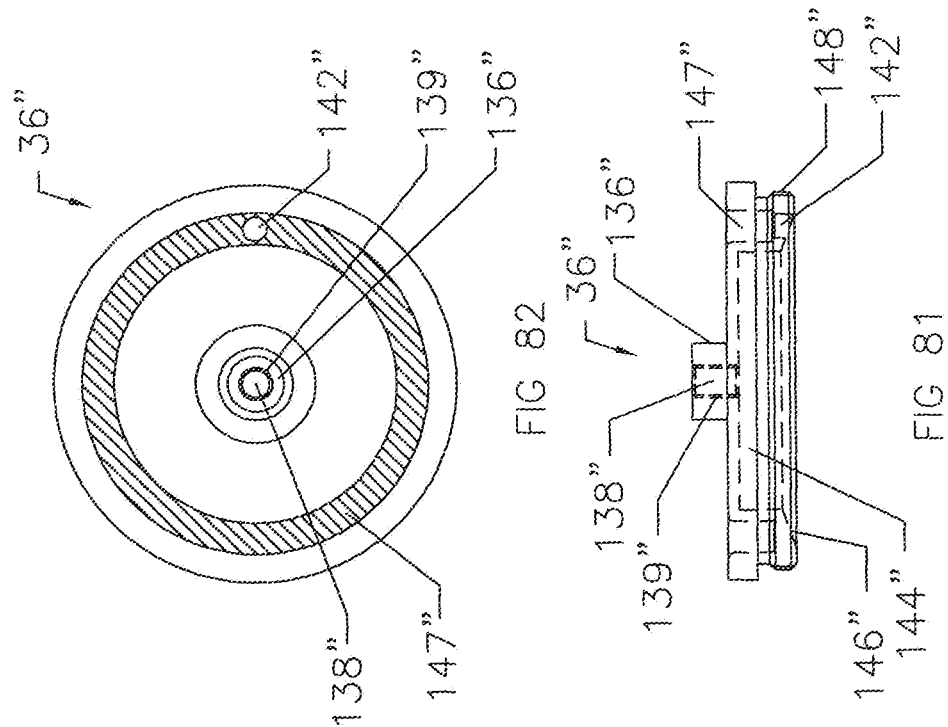

HIGH INLET PRESSURE THREE-STAGE PRESSURE REGULATOR

CROSS-REFERENCE TO RELATED APPLICATIONS

This application claims the benefit of U.S. Provisional Application No. 61/238,392 filed Aug. 31, 2009, and is a continuation-in-part of, and claims priority to, U.S. application Ser. No. 11/999,941 filed Dec. 7, 2007 now U.S. Pat. No. 8,087,428, which claimed the benefit of U.S. Provisional Application No. 60/873,870 filed Dec. 7, 2006, the contents of which are incorporated in their entirety herein by reference.

BACKGROUND OF THE DISCLOSURE

1. Field of the Disclosure

The disclosure relates generally to valves used to regulate fluid pressure in a system and more particularly to valves employing a diaphragm to regulate high fluid pressures.

2. Statement of the Prior Art

Current miniature pressure regulating valves can only handle relatively small reductions in pressure. In addition, many such valves have problems with valve seats. It is difficult to obtain the geometries and finishes necessary to maintain a good valve seat. What is described herein solves these problems by using either a ball valve or a poppet valve in conjunction with one or more diaphragms to regulate pressure. The disclosure also provides an apparatus to reduce very high pressures to much lower pressures under varying pressure and flow conditions while it regulates the pressure flow of fluids and/or gases in a consistent, stable manner.

SUMMARY OF THE DISCLOSURE

In one aspect of the disclosure, a two-stage regulator uses a combination of a spring actuated piston with a poppet valve in a first stage and a diaphragm in a second stage to regulate fluid pressure in a system. In an alternate embodiment, a ball valve is used in combination with the diaphragm to regulate pressure. In another aspect of the disclosure, a two-stage valve uses a combination of poppet valves and a diaphragm to regulate fluid pressure in a system. In a yet further embodiment, a poppet valve is combined with second stage and third stage diaphragms to regulate pressure. Each embodiment provides excellent valve seating characteristics and sustainable pressure regulation over a wide range of pressures. These and other objects and features of the disclosure will be apparent from a review of the drawings and a reading of the following detailed description of the disclosure.

BRIEF DESCRIPTION OF THE DRAWINGS

FIG. 1 is a side sectional view in partial phantom of a two-stage diaphragm valve according to one embodiment of the disclosure.

FIG. 2 is a side sectional view in partial phantom of a two-stage regulator body showing an inlet port and piston chamber in phantom according to one embodiment of the disclosure.

FIG. 3 is a side sectional view in partial phantom of a two-stage regulator body showing the inlet port and outlets (in phantom) according to one embodiment of the disclosure.

FIG. 4 is a top plan view in partial phantom of a two-stage regulator body showing inlet, outlets and piston chamber (in phantom) according to one embodiment of the disclosure.

FIG. 8 is a side elevational view in partial phantom of a regulator body cap with a long cap stem according to one embodiment of the disclosure.

FIG. 9 is a side elevational view in partial phantom of a regulator body cap with a short cap stem according to another embodiment of the disclosure.

FIG. 10 is a bottom view of a regulator body cap according to one embodiment of the disclosure.

FIG. 11 is a side view in partial phantom of a piston cap according to one embodiment of the disclosure.

FIG. 12 is a top view of a piston cap according to one embodiment of the disclosure.

FIG. 13 is an exploded view in partial phantom of a filter and filter o-ring subassembly according to one embodiment of the disclosure.

FIG. 14 is a bottom view of a filter according to one embodiment of the disclosure.

FIG. 15 is a side view of a piston spring according to one embodiment of the disclosure.

FIG. 16 is a top view of a piston spring according to one embodiment of the disclosure.

FIG. 17 is an exploded side sectional view in partial phantom of a gland nut and o-ring subassembly according to one embodiment of the disclosure.

FIG. 18 is a bottom view of a gland nut according to one embodiment of the disclosure.

FIG. 19 is a top view of a gland nut according to one embodiment of the disclosure.

FIG. 20 is a side sectional view in partial phantom of an o-ring retainer according to one embodiment of the disclosure.

FIG. 21 is a top view of an o-ring retainer according to one embodiment of the disclosure.

FIG. 22 is a side sectional view in partial phantom of a gland nut/o-ring subassembly according to one embodiment of the disclosure.

FIG. 23 is a side sectional view in partial phantom of a piston/valve poppet subassembly according to one embodiment of the disclosure.

FIG. 24 is an exploded side sectional view in partial phantom of a piston/valve poppet subassembly according to one embodiment of the disclosure.

FIG. 25 is a side sectional view in partial phantom of a piston according to one embodiment of the disclosure.

FIG. 26 is a top view of a piston according to one embodiment of the disclosure.

FIG. 27 is a side sectional view in partial phantom of a valve poppet according to one embodiment of the disclosure.

FIG. 28 is a top view of a valve poppet according to one embodiment of the disclosure.

FIG. 29 is a side sectional view of a poppet valve plug according to one embodiment of the disclosure.

FIG. 30 is a top view of a poppet valve plug according to one embodiment of the disclosure.

FIG. 35 is a side sectional view of a plunger according to one embodiment of the disclosure.

FIG. 36 is a bottom view of a plunger according to one embodiment of the disclosure.

FIG. 37 is a side sectional view in partial phantom of a spring cup according to one embodiment of the disclosure.

FIG. 38 is a top view of a spring cup according to one embodiment of the disclosure.

FIG. 39 is a side sectional view in partial phantom of a valve adjustment screw according to one embodiment of the disclosure.

FIG. 40 is a side sectional view of a locking nut according to one embodiment of the disclosure.

FIG. 41 is a top view of a locking nut according to one embodiment of the disclosure.

FIG. 48 is a side elevational view in partial phantom of a three-stage valve showing the three stages according to another embodiment of the disclosure.

FIG. 49 is a side elevational view in partial phantom of a three-stage valve showing the second and third stages and an outlet according to the embodiment of the disclosure shown in FIG. 48.

FIG. 50 is a side sectional view in partial phantom of a cross plug according to another embodiment of the disclosure.

FIG. 51 is a bottom view of the cross plug shown in FIG. 50 according to another embodiment of the disclosure.

FIG. 52 is a side sectional view of a first-stage spring of a three-stage regulator according to another embodiment of the disclosure.

FIG. 53 is a side sectional view in partial phantom of a first-stage packing seal plate assembly of a three-stage regulator according to another embodiment of the disclosure.

FIG. 54 is a top view of a packing seal plate assembly of a three-stage regulator according to another embodiment of the disclosure.

FIG. 55 is a side sectional view of a packing seal o-ring according to another embodiment of the disclosure.

FIG. 56 is a side sectional view of a face seal o-ring of a packing seal plate according to another embodiment of the disclosure.

FIG. 57 is a side sectional view in partial phantom of a packing seal plate of a three-stage regulator according to another embodiment of the disclosure.

FIG. 58 is a bottom view of a packing seal plate of a three-stage regulator according to another embodiment of the disclosure.

FIG. 59 is a top view of a seal retaining ring of a packing seal plate according to another embodiment of the disclosure.

FIG. 60 is a side sectional view of the seal retaining ring shown in FIG. 59 according to another embodiment of the invention.

FIG. 61 is a side sectional view in partial phantom of a first-stage piston of a three-stage regulator according to another embodiment of the disclosure.

FIG. 62 is a bottom view of the first-stage piston shown in FIG. 61 according to another embodiment of the invention.

FIG. 63 is an exploded side sectional view in partial phantom of a first-stage piston and poppet assembly of a three-stage regulator according to another embodiment of the disclosure.

FIG. 64 is a side sectional view in partial phantom of a first-stage piston and poppet assembly of a three-stage regulator according to another embodiment of the disclosure.

FIG. 65 is a side sectional view in partial phantom of a poppet of a three-stage regulator according to another embodiment of the disclosure.

FIG. 66 is a bottom view of the poppet shown in FIG. 65 according to another embodiment of the disclosure.

FIG. 67 is a side sectional view in partial phantom of a first-stage cylinder of a three-stage regulator according to another embodiment of the disclosure.

FIG. 68 is a top view of the first-stage cylinder shown in FIG. 67 according to another embodiment of the invention.

FIG. 69 is a side view of a filter of a three-stage regulator according to another embodiment of the disclosure.

FIG. 70 is a top view of a valve seat of a three-stage regulator according to another embodiment of the disclosure.

FIG. 71 is a side sectional view in partial phantom of the valve seat shown in FIG. 70 according to another embodiment of the invention.

FIG. 72 is a side sectional view of a face-seal o-ring of the valve seat shown in FIG. 70 according to another embodiment of the invention.

FIG. 73 is a bottom view of the valve seat shown in FIG. 70 according to another embodiment of the invention.

FIG. 74 is a bottom view of a retaining ring according to another embodiment of the disclosure.

FIG. 75 is a side sectional view in partial phantom of the retaining ring shown in FIG. 74 according to another embodiment of the disclosure.

FIG. 76 is a side elevational view in partial phantom of the body of the three-stage valve shown in FIG. 48 according to one embodiment of the disclosure.

FIG. 77 is a side elevational view in partial phantom of the body shown in FIG. 76 as seen from the first stage according to one embodiment of the disclosure.

FIG. 78 is a top view in partial phantom of the body shown in FIG. 76 according to one embodiment of the disclosure.

FIG. 79 is a side sectional view in partial phantom of a second stage body cap according to one embodiment of the disclosure.

FIG. 80 is a top view of a second stage body cap according to one embodiment of the disclosure.

FIG. 81 is a side sectional view in partial phantom of a third stage body cap according to one embodiment of the disclosure.

FIG. 82 is a top view of a third stage body cap according to one embodiment of the disclosure.

DETAILED DESCRIPTION

Figure 5:
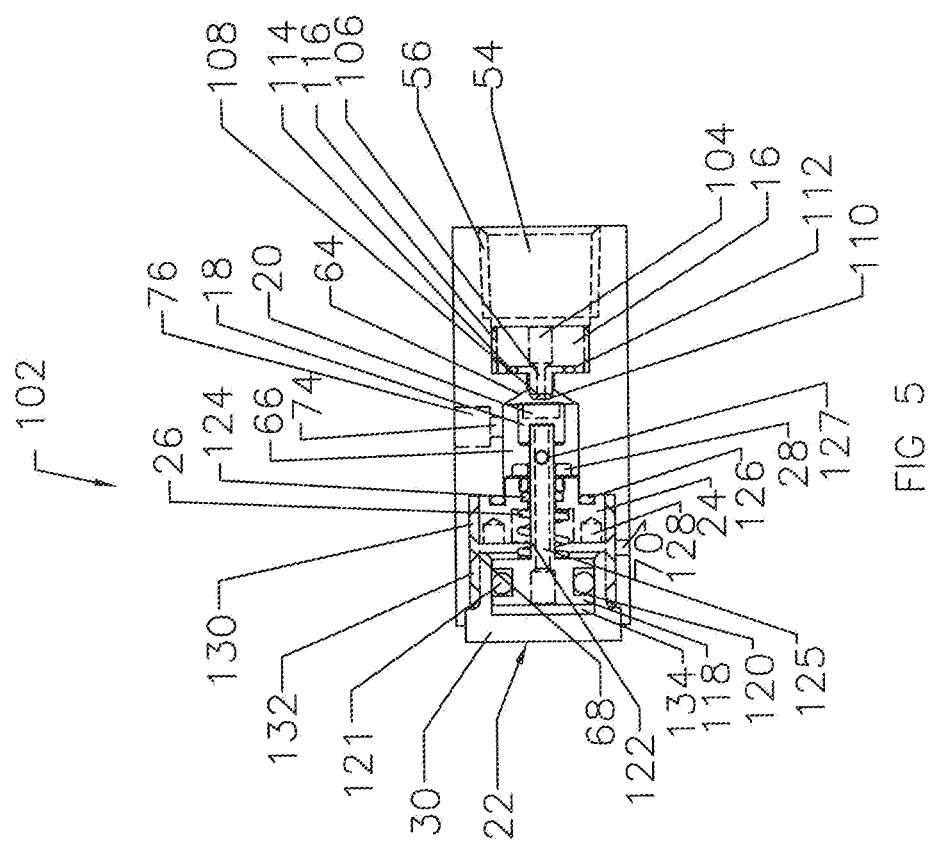
FIG. 5 is a side sectional view of the inlet/piston chamber/piston sub-assembly according to one embodiment of the disclosure.

In one aspect of the disclosure, as shown in FIG. 1, a two-stage regulator 10 combines an elastomeric diaphragm and a piston/poppet valve assembly to regulate pressure. In a first stage valve, the regulator comprises a regulator body 12, an inlet port 14, a filter 16, a valve poppet 18 with a polymeric poppet plug 20, a piston 22, a gland nut 24, a piston spring 26, an o-ring retainer 28, and a piston cap 30 along with a series of o-rings, described more fully below.

A second stage valve comprises regulator body 12, a valve adjustment screw 32, locking nut 34, regulator body cap 36, plunger 38, Bellville washers 40, spring cup 42, diaphragm 44, valve actuator 46, valve seat 48, ball 50 and ball valve spring 52. The second stage also incorporates a set of o-rings as more fully disclosed below.

Referring to FIGS. 2-4, regulator body 12 includes an inlet port 54 with optional threading 56 about the perimeter of the port for receiving adapters (not shown) from high pressure fluid sources. Port 54 is in fluid communication with filter port 58 that may be formed with, or provided with, filter port threading 60 to receive filter 16. A connector port 62 connects filter port 58 to a gland nut port 66, which is connected to, and in fluid communication with, a piston port 68. The connection point between connector port 62 and gland nut port 64 can be tapered to ensure proper alignment of piston/valve poppet subassembly 162 within gland nut port 64 as shown in FIGS. 1 and 24.

Fluid communication between the first stage and the second stage is provided by a stage connector port 74. Connector port 74 connects gland nut port 64 and a ball valve port 76. Ball valve port 76 connects to, and is in fluid communication with, valve seat port 78, which may include optional valve seat port threading 80 to secure valve seat 48. Valve seat port 78 connects to diaphragm port 88, which includes a tapered bottom 84 that allows diaphragm 44 to flex downward relative to downward pressure settings produced by the second-stage assembly components and provides a bottom support for diaphragm 44 to ensure protection of the diaphragm's physical and functional integrity.

Diaphragm port 88 also includes a flat portion 86 about the periphery of the port to provide structural support for the diaphragm when placed in the regulator body 12. Diaphragm port 88 can also be provided with diaphragm port threading 90 to engage with threading on regulator body cap 36. Threading 90 is formed in a body upper wall 100 that may be annular in shape as shown.

Extending down and in fluid communication with diaphragm port 88 is at least one outlet connector port 92. As shown in FIG. 3, two or more such ports may be formed or provided in regulator body 12. Connector port 92 connects to, and is in fluid communication with, outlet port 94 via an internal portion 96. Outlet port 94 may include outlet port threading 98 to engage similarly threaded attachments (not shown). To register the internal pressure against resident atmospheric pressure, vent 70 is formed in regulator body 12 so as to be in fluid communication with piston bore 68.

Referring to FIG. 5, the components of the first stage 102 are shown. Torqued into filter port 58 is filter 16. An annular channel 112 is formed on a bottom surface of filter 16 to create a seal between regulator housing 12 and filter 16 to prevent fluid flowing through filter 16 from being directed into filter port 58. A filter o-ring 114 fits within channel 112 and provides a seal between filter 16 and the bottom of filter port 58. Annular surfaces 117 and 119a (shown in FIGS. 13 and 14) form a face of filter 16 that interfaces with the bottom of filter port 58.

Referring to FIGS. 5, 13 and 14, filter 16 has a large fluid bore 104 that reduces down in diameter at a point 111 to a narrow bore 106 formed in a cylindrical shaft 115 that extends from the body of filter 16 and that ends with filter opening 108. Shaft 115 is dimensioned to fit within connector port 62. Filter 16 further has a tapered tip 110 that enhances the seal and alignment between tip 110 and polymeric insert 20. Filter 16 may have perimeter threading 116 that engages threading 60 of filter port 58.

Referring to FIGS. 5 and 23-30, contained within piston port 68 is piston 22 that has a piston head 188, which includes an annular channel 120 for receiving piston o-ring 121. The formation of channel 120 creates a top portion 118 and a bottom portion 119 of piston head 188. O-ring 121 creates a seal between piston head 188 and piston port 68. Attached to head 188 is piston shaft 122. Formed within and extending through piston shaft 122 is piston bore 125. Bore 125 may be formed with a radially-enlarged bore segment 123 within piston head 188 as shown in FIG. 5. Proximal to a distal end of shaft 122 is shaft aperture 127, which enables piston bore 121 to be in fluid communication with gland nut bore 66. Attached to the distal end of shaft 122 via friction fit, interference fit or other like means is poppet valve 18 that has a polymeric insert 20 set into a poppet valve bore 21 formed in an end of valve 18. Insert 20 is designed to register against tip 110 of filter 16. The combination of piston 22, poppet valve 18 and insert 20 forms piston/poppet valve subassembly 162 shown in FIGS. 23 and 24.

Piston 22 is secured in piston bore 68 with piston cap 30 shown in FIGS. 1, 5, 11 and 12. Piston cap 30 is secured to piston bore 68 with piston cap threading 132 that engages piston port threading 72. Positioned about piston shaft 122 is piston spring 26. A proximal end of spring 26 registers against bottom annular segment 119 of piston head 188 while a distal end registers against the bottom of a piston spring bore 152 formed in a top side of gland nut 24. Referring to FIGS. 17-22, gland nut 24 is secured in gland nut port 66 and a bottom end of piston port 68 with gland nut threading 130 that engages piston port threading 72.

Approximately concentric with piston spring bore 152 is piston shaft bore 154 dimensioned to receive in sliding engagement piston shaft 122. Extending from gland nut 24 is gland nut shaft 131a dimensioned to fit within gland nut port 66. Formed in shaft 131a is o-ring support bore 157 that is in fluid communication with piston shaft bore 154 and creates a seat for shaft o-ring 124. Shaft o-ring 124 creates a sliding seal between the outer perimeter of piston shaft 122 and gland nut 24. O-ring 124 is maintained in position with o-ring retainer 28, a shaft 160 extending from the body of retainer 28 fits within support bore 157 via friction fit, adhesive or other like securing means. A retainer head 158 of retainer 28 registers against a bottom surface of gland nut 24. Retainer 28 is formed with a retainer bore 156 dimensioned to receive piston shaft 122 in sliding engagement. The combination of gland nut 24, retainer 28 and their associated o-rings form gland nut/o-ring subassembly 150 shown in FIG. 22.

Formed on a bottom surface of gland nut 24 is an annular gland nut o-ring channel 155 configured to received gland nut o-ring 126, which creates a seal between gland nut 24 and the bottom surface of piston port 94. Formed in a top surface of gland nut 24 are tool bores 128, which enable gland nut 24 to be torqued into piston port 68 with a two-tine torquing tool.

With respect to the described first stage 102, pressure reduction is accomplished in accordance with the following mechanism. Pressurized fluid or gas enters gland nut port 66 via filter 16. The pressurized fluid flows into gland nut port 66 and into connector port 74 that connects in fluid communication first stage 102 to the second stage. A portion of the pressurized fluid and/or gas flows into aperture 127 and along piston bore 125. The pressurized fluid and/or gas flows into piston cavity 134 defined by cap 30 and piston top portion 118. The introduction of pressurized fluid and/or gas urges piston 188 against poppet valve 18, which urges insert 20 toward tip 110 of filter 16. The pressure overcomes the axial tension of piston spring 26 that is tensioned to accommodate the desired pressure range. As insert 20 and poppet valve 18 move toward filter 16, the reduction in the gap formed between insert 20 and filter tip 110 results in reduced fluid flow and reduced pressure, which communicates with and is further adjusted by the pressure set by the second stage.

Figure 6:
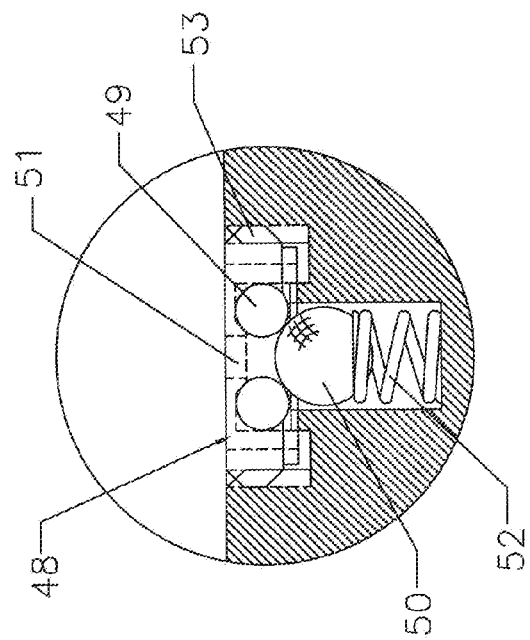
FIG. 6 is a side sectional view in partial phantom of a second stage ball valve subassembly according to one embodiment of the disclosure.
Figure 7:
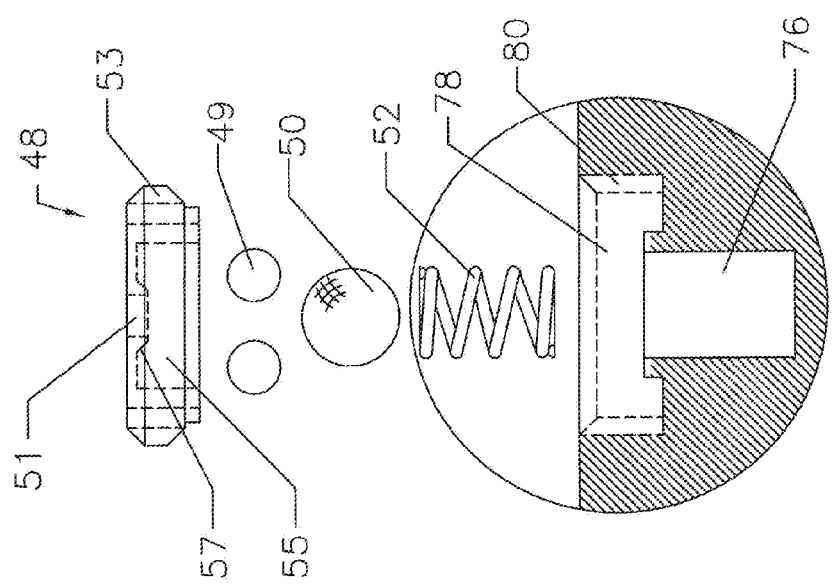
FIG. 7 is an exploded view in partial phantom of a second stage ball valve subassembly according to one embodiment of the disclosure.

Referring now to FIGS. 6 and 7, a ball valve assembly in the second stage is shown. The assembly includes ball 50 urged against valve seat 48 via ball valve spring 52 that has a pre-loaded axial tension. Valve seat 48 includes a valve seat bore 55 dimensioned to receive a valve seat o-ring 49 positioned in bore 55. An annular channel is formed on a bottom surface of bore 55 to help secure and center o-ring 49 in valve seat 48. Valve seat 48 further includes a secondary valve seat bore 51 substantially concentric with valve seat bore 55 that provides fluid communication through the valve seat. The main components of the ball valve subassembly are shown throughout FIGS. 31-34.

Figures 31, 32, 33, 34:
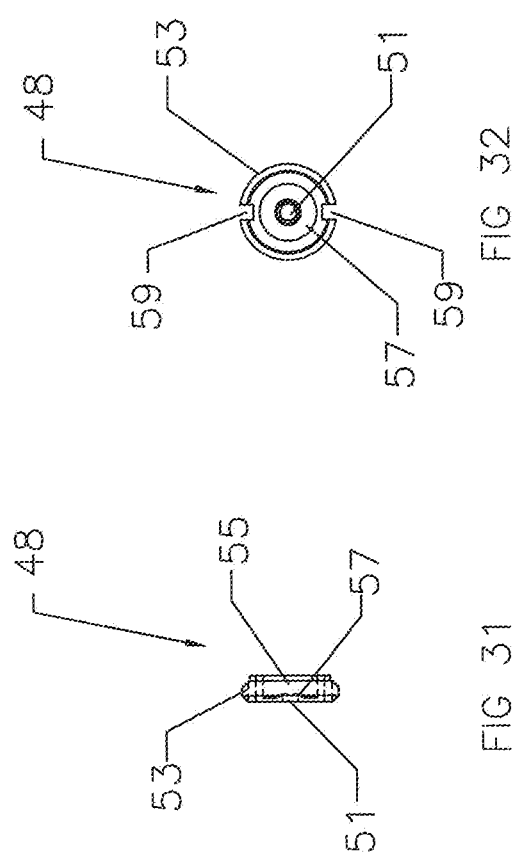
FIG. 31 is a side sectional view in partial phantom of a ball valve seat according to one embodiment of the disclosure.
FIG. 32 is a bottom view of a ball valve seat according to one embodiment of the disclosure.
FIG. 33 is a side sectional view of a ball valve spring according to one embodiment of the disclosure.
FIG. 34 is a plan view of a ball valve according to one embodiment of the disclosure.

Referring to FIGS. 31 and 32, formed on a perimeter of valve seat 48 is valve seat threading 53 configured to engage valve seat bore threading 80 formed in the wall of valve seat port 78. Valve seat 48 may include a pair of slots 59 (shown in FIG. 32), to receive a two-tine torque tool to torque valve seat 48 into valve seat port 78. Valve spring 52 registers against ball 50 at a top end and against a bottom surface of ball valve port 76 at a bottom end. Valve port 76 is dimensioned to be slightly larger in diameter than ball 50 to allow ball 50 to freely move along at least part of the length of valve port 76. Spring 52 urges ball 50 into a sealing arrangement with o-ring 49 so as to seal off fluid communication between ball valve port 76 and secondary valve seat bore 51, which, in turn, effectively prevents fluid communication between ball valve port 76 and diaphragm port 88.

Figure 46:
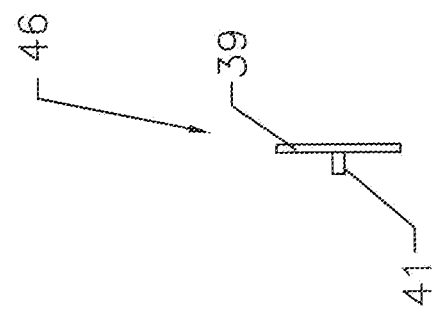
FIG. 46 is a side sectional view of a valve actuator according to one embodiment of the disclosure.
Figure 47:
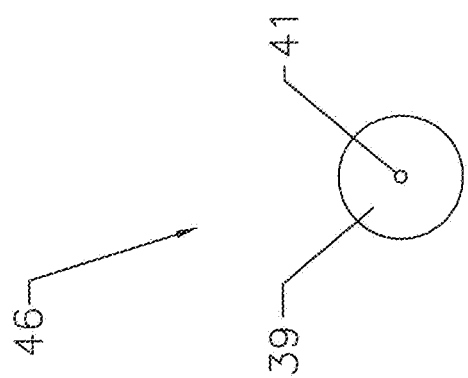
FIG. 47 is a bottom view of a valve actuator according to one embodiment of the disclosure.

Referring to FIGS. 1, 46 and 47, positioned above valve seat 48 is valve actuator 46 that includes a generally circular disk-shaped body 39 with a downwardly projecting actuator shaft 41 dimensioned to fit within secondary valve seat bore 51. Shaft 41 is dimensioned so as not to completely occlude valve seat bore 51 when urged into bore 51. A distal tip of shaft 41 registers against ball 50 and transmits pressure imparted on actuator 46 by diaphragm 44 that contacts a top surface of actuator 46.

Figure 42:
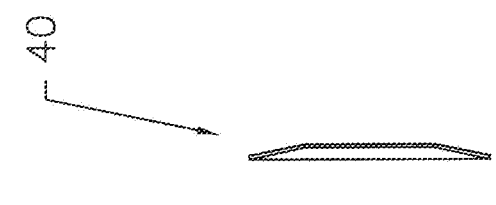
FIG. 42 is a top view of a Bellville washer according to one embodiment of the disclosure.
Figure 43:
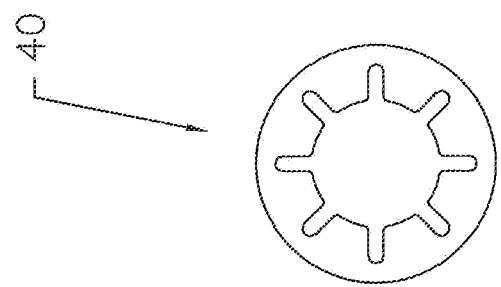
FIG. 43 is a side sectional view of a Bellville washer according to one embodiment of the disclosure.
Figure 44:
FIG. 44 is a top view of a diaphragm according to one embodiment of the disclosure.
Figure 45:
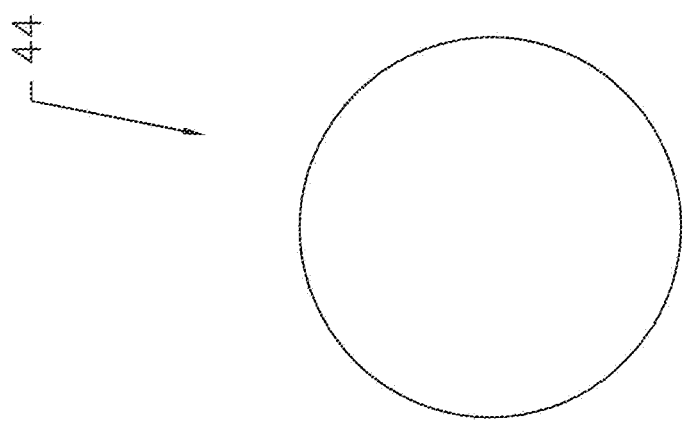
FIG. 45 is a side sectional view of a diaphragm according to one embodiment of the disclosure.

As shown in FIGS. 44 and 45, diaphragm 44 is made from an elastomeric material and is positioned in diaphragm bore 88 so that the perimeter of the substantially circular diaphragm sits on flat portion 86. Referring to FIGS. 1, 37 and 38, positioned above diaphragm 44 is spring cup 42. Spring cup 42 is generally circular in shape with a substantially flat bottom surface and an annular wall 45 that defines a cup cavity 43 configured to receive and support Bellville washers 40 shown in FIGS. 42 and 43. Annular wall 45 of spring cup 42 is, dimensioned to fit within a substantially circular cap cavity 144. The combination of spring cup 42 and cavity 144 contain Bellville washers 40 in a concentric relationship with the other components of the second stage.

Referring to FIGS. 1, 35 and 36, positioned above the top-most Bellville washer is plunger 38 that has a generally circular top section 47 with a reduced diameter bottom section 49. An aperture 43 is formed substantially in the center of the plunger to receive a tip 31 of set screw 32. Reduced diameter section 49 is dimensioned to fit within a substantially circular gap in the top-most Bellville washer 40, which ensures plunger 38 remains concentric with the washers 40 and the other components of the second stage.

Referring to FIGS. 1 and 8-10, body cap 36 is generally circular in shape with an optional annular channel 147 formed in a top surface to provide a means for product weight reduction. A vent bore 142 is formed in cap 36 to provide access to ambient pressure as a reference point for the regulator's internal pressure. Cap 36 has cap threading 148 provided around a bottom section of the cap. A bottom-most end of cavity 144 transitions into a flanged surface 146 to provide a relatively edge-free surface for diaphragm 44 to contact regardless of the particular pressure setting of the second stage. This ensures diaphragm 44 will not shear or tear when in contact with cap 36.

Extending upwardly from cap 36 is cap stem 136 (long form shown in FIG. 8) or 136a (short form shown in FIG. 9). An optional stem flange 141 may be formed at a base of the stem to provide structural support for stem 136 or to provide a further surface for engagement of the regulator to a larger assembly. An exterior surface of stem 136 is provided with stem threading 140 that engages locking nut threading 37a. An interior surface of stem 136 is also provided with internal stem threading 139 that engages set screw threading 35 formed on an exterior surface of set screw 32 shown in FIG. 39). Cap 36 has a central cap bore 138 in fluid communication with cavity 144. Bore 138 is dimensioned to receive set screw 32 that is torqued into stem 136/136a and set by torquing locking nut 34 onto set screw 32 via threaded locking nut aperture 37 dimensioned to receive set screw 32 until nut 34 contacts the top of cap stem 136 or 136a.

As shown in FIG. 39, set screw 32 has a main cylindrical body 29 with exterior set screw threading 35 extending substantially about the length of set screw 32. A slot 33 is formed in a top of set screw 32 to provide a means to torque the set screw with a screw driver or other flat-bladed implement. A bottom end of set screw 32 may be formed so as to taper down to a point 31. This allows the tip of set screw 32 to precisely engage aperture 43 of plunger 38.

Having thus described the components of Applicants novel pressure regulator, a method of operation so as to regulate and reduce very high pressures to much lower pressures will now be described. To operate the regulator, fluid and/or gas is introduced into inlet 54 at a pressure ranging from about 1 psi to about 8000 psi. The fluid travels through filter 16 and into gland nut port 96 and enters stem aperture 127. The fluid then travels through piston bore 121 into piston cavity 134. The high pressure counters the force imparted on piston 22 by piston spring 26 so that piston 22 moves towards tip 110 of filter 16. If tip 110 becomes engaged with polymeric disk 20, the fluid flow will be arrested. However, the pressure of the fluid flowing out of tip 110 combined with the axial force applied by spring 26 against piston 22 should always be slightly greater than the pressure realized in piston cavity 134 so that the first stage should always remain open. The configuration of the first stage allows for a substantial reduction in the initial pressure of the fluid from as much as about 8000 psi down to 100 or 200 psi, which is the pressure exerted on ball valve 50 exclusive of the force exerted on ball valve 50 by ball valve spring 52.

At the initial introduction of fluid into the regulator, the full initial fluid pressure is exerted against ball valve 50 until the fluid has flowed through piston 22 and into cavity 134 where the pressure acts as a countervailing force to the pressure created by the incoming fluid. After the initial flow, the fluid pressure exerted on ball valve 50 is much reduced.

To set the second stage pressure, set screw 32 is adjusted to urge a desired pressure on plunger 38. That pressure is transmitted onto Bellville washers 40, which, in turn, exert the pressure onto spring cup 42. The pressure is then transmitted to diaphragm 44, which urges valve actuator 38 against ball 50 so as to lower ball 50 to allow fluid and/or gas to flow into diaphragm port 88 into connector port 92 and out exit port 94 at a controlled desired pressure.

Referring now to FIGS. 48 and 49, in another aspect of the invention, a three-stage regulator 300 combines two elastomeric diaphragms and a piston/poppet valve assembly to regulate pressure. In a first stage, the regulator comprises a regulator body 302, an inlet port 304 (shown in FIG. 48), a filter 252, a valve seat 236, a valve poppet 212', a hollow piston 200, a seal plate 222, a piston nut 254, a piston spring 26', a piston cup 214 along with a series of o-rings, described more fully herein.

A second stage comprises the regulator body 302, second-stage regulator body cap 36', second-stage plunger 38', second-stage Bellville washers 40', second-stage spring cup 42', second stage diaphragm 44', second stage valve actuator 46', second stage valve seat 48', second-stage ball valve 50' and second-stage ball valve spring 52'. The second stage further comprises a set of o-rings described herein A third stage is in fluid communication with the second stage and comprises the regulator body 302, third stage regulator body cap 36", valve adjustment screw 32', locking nut 34', third-stage plunger 38", third-stage Bellville washers 40", third-stage spring cup 42", third-stage diaphragm 44", third stage valve actuator 46", third-stage valve seat 48", third stage ball valve 50" and third-stage ball valve spring 52".

Referring now to FIGS. 76-78, three-stage regulator body 302 is shown having a generally cylindrical shape. The exterior shape of the regulator body can conform to any regular, or irregular geometric shape to suit the needs of any particular application made of the regulator. Body 302 includes an inlet port 304 with optional threading 306 about the perimeter of the port for receiving adapters (not shown) for pressurized fluid sources. Threading 306 also provides a mechanical mating surface for valve seat 236 secured within port 304 as shown in FIG. 48.

Inlet port 304 is in fluid communication with connector port 308 that connects inlet port 304 with a poppet port 310 that houses poppet 212. A portion of poppet port 310 proximal to connector port 308 may include a tapered, frustoconical shape 312 to ensure the poppet/piston assembly (shown in FIG. 48) remains aligned centrally within the port during operation. Of particular importance is that the piston/poppet assembly remains aligned with valve seat 236 to ensure proper and desired control of pressure in the first stage. When an exceedingly high pressure is experienced by the piston/poppet assembly, pressure received at a top end of the piston urges the piston/poppet assembly toward valve seat 236 and closes off the valve until the pressure has decreased sufficiently to allow the piston/poppet assembly to retreat from the closed position via the tension spring.

Poppet port 310 is also in fluid communication with seal plate port 314 that receives and houses seal plate 222. Port 314 is not formed with threading. Seal plate 222 is maintained in port 314 via mechanical restraint and close tolerance dimensions between the port and the seal plate.

Seal plate port 314 is also in fluid communication with piston cap port 316. Port 316 may be formed with threading 318 to receive in mating engagement a piston nut 254 that secures a piston cap 214 to body 302. A piston vent aperture 320 is formed substantially within the junction of seal plate port to register the pressure of the first stage to resident atmospheric pressure.

Fluid communication between the first stage and second stage is accomplished via a second stage connector port 322 that connects poppet port 310 and a second stage ball valve port 324. Second stage ball valve port 324 is further connected to, and in fluid communication with second stage ball valve seat port 326. Valve seat port 326 may be formed with second stage ball valve seat port threading 328. Second stage valve seat 48' is secured via threading into valve seat port 326 (FIGS. 7, 31 and 32).

Valve seat port 326 is connected to, and in fluid communication with, second stage diaphragm chamber 330 that includes a tapered bottom 344 that permits diaphragm 44', housed in the chamber, to flex downward relative to pressures in excess of atmospheric pressure produced by the second stage components. Bottom 344 further provides a robust support surface for diaphragm 44' to ensure and protect the diaphragm's structural and functional integrity when forced into an extreme, extended condition.

Diaphragm chamber 330 further includes an annular flat portion 334 about the periphery of the port to provide structural support for the diaphragm when placed in regulator body 302. Diaphragm chamber 330 may also be formed with diaphragm port threading 336 included to receive and engage threading on a second stage regulator body cap 36'. Threading 336 is formed in a substantially annular upper body wall 338.

Connection and fluid communication between the second stage and the third stage is accomplished by the combination of a connector channel 340 formed in regulator body 302 (as shown in FIG. 77), and a banjo plug port 341. Channel 340 specifically connects second stage diaphragm chamber 330 with banjo plug port 341. Banjo plug port 341 connects to third stage ball valve port 358.

Third stage ball valve port 358 is further connected to, and in fluid communication with third stage ball valve seat port 360. Valve seat port 360 may be formed with third stage ball valve seat port threading 362. Third stage valve seat 48" is secured via threading into valve seat port 360 (FIGS. 7, 31 and 32).

Valve seat port 360 is connected to, and in fluid communication with, third stage diaphragm chamber 342. Like the second stage diaphragm port 330, third stage diaphragm chamber 342 includes a tapered bottom 344 that permits diaphragm 44", housed in the chamber, to flex downward relative to pressures in excess of atmospheric pressure produced by the third stage components. Bottom 344 further provides a robust support surface for diaphragm 44" to ensure and protect the diaphragm's structural and functional integrity when forced into an extreme, extended condition.

Diaphragm chamber 342 further includes an annular flat portion 350 about the periphery of the port to provide structural support for the diaphragm when placed in regulator body 302. Diaphragm chamber 342 may also be formed with diaphragm port threading 346 included to receive and engage threading on a third stage regulator body cap 36". Threading 346 is formed in a substantially annular upper body wall 348.

Third stage diaphragm chamber 342 is connected to, and in fluid communication with outlet port 354 via outlet channel 352. Outlet port 354 may be formed with threading 356 to receive attachments, e.g., barbed fittings to join tubes and the like to the regulator.

Referring now to FIGS. 48, 49, 79 and 80, second stage body cap 36' is generally circular in shape with an optional annular channel 147' formed in a top surface to provide a means for product weight reduction. A second stage cap vent bore 142' is formed in cap 36' to provide access to resident ambient pressure as a reference point for the regulator's internal pressure. Cap 36' has cap threading 148' provided around a bottom section of the cap. A bottom-most end of cavity 144' transitions into a flanged surface 146' to provide a relatively edge-free surface for diaphragm 44' to contact regardless of the particular pressure setting of the second stage. This ensures diaphragm 44' will not shear or tear when in contact with cap 36'.

In an alternate embodiment, a cap substantially similar to the adjustable cap 36" of the third stage, (described more fully below), may be substituted for second stage cap 36'. The substitution provides additional adjustability to the second stage, if required or desired, due to the addition of a set screw to adjust the force exerted onto the second stage diaphragm by the second stage Belleville washers.

Referring now to FIGS. 48, 49, 81 and 82, a third stage body cap 36" is generally circular in shape with an optional annular channel 147" formed in a top surface to provide a means for product weight reduction. A vent bore 142" is formed in cap 36" to provide access to resident ambient pressure as a reference point for the regulator's internal pressure. Cap 36" has cap threading 148" provided around a bottom section of the cap. A bottom-most end of cavity 144" transitions into a flanged surface 146" to provide a relatively edge-free surface for diaphragm 44" to contact regardless of the particular pressure setting of the third stage. This ensures diaphragm 44" will not shear or tear when in contact with cap 36".

Extending upwardly from cap 36" is cap stem 136". An interior surface of stem 136" is formed or provided with internal stem threading 139" that engages set screw threading 35" formed on an exterior surface of set screw 32" (shown in FIG. 39). Cap 36" has a central cap bore 138" in fluid communication with third stage diaphragm port 342. Bore 138" is dimensioned to receive set screw 32" torqued into stem 136" and set by torquing locking nut 34" onto set screw 32" via threaded locking nut aperture 37" dimensioned to receive set screw 32" until nut 34" contacts the top of cap stem 136".

As shown in FIG. 39, set screw 32" has a main cylindrical body 29" with exterior set screw threading 35" extending substantially about the length of the set screw. A slot 33" is formed in a top of set screw 32" to provide a means to torque the set screw with a screw driver or other flat-bladed implement. A bottom end of set screw 32" may be formed so as to taper down to a point 31". This allows the tip of set screw 32" to precisely engage aperture 43" of plunger 38".

Referring now to FIGS. 53-58, seal plate 222 includes a spring bore 224 formed on one end of seal plate 222 that receives and provides radial support to one end of tension spring 26'. Spring bore 224 connects to, and is in fluid communication with, seal bore 230 dimensioned to enable piston 200 to slide freely within bore 230.

Formed on the end opposite spring bore 224 is piston bore 228 dimensioned to receive seal o-ring 234, which registers against a bottom wall of bore 228, and is secured inside bore 228 with seal retaining ring 262. The perimeter of ring 262 is dimensioned to provide a friction fit when inserted into bore 228. Ring 262 has portions defining a piston aperture 263 dimensioned to be larger than the diameter of the shaft of piston 200. Ring 262 is inserted deep enough into bore 228 to restrain seal o-ring 234 against the side walls and bottom of bore 228 without causing any deformation of the o-ring. Seal o-ring 234 has an aperture diameter dimensioned to receive the shaft of piston 200 and maintain a seal between seal plate 222 and piston 200 throughout the piston's range of motion.

Seal plate 222 includes an annular recess 227 formed about the perimeter of the end in which bore 228 is formed. Recess 227 provides a shoulder, the diameter of which is dimensioned to fit within poppet bore 310. The fit should have sufficient tolerance to allow the shoulder of recess 227 to slide freely, but snugly within poppet bore 310. Formed on a bottom surface of recess 227 is an annular seal plate channel 226 that surrounds bore 228. Channel 226 is dimensioned to receive seal-plate o-ring 232. O-ring 232 forms a seal between seal plate 222 and a bottom annular shoulder formed in seal plate port 314.

Seal plate 222 has a top annular recess 225 dimensioned to receive a flange of cap 214 disclosed more fully below. Recess 225 provides both a radial movement restriction and an end stop for cap 214. The outer diameter of seal plate 222 is structured to be close fitting to the poppet bore and piston bore walls to eliminate the need of threading. This allows seal plate 222 to self-align and eliminates any misalignment caused by threading as explained more fully below.

Referring now to FIGS. 61-66, piston 200 comprises a piston head 202 and a piston shaft 210. An annular piston channel 204 is formed in head 202 to receive piston o-ring 121'. O-ring 121' slides within piston cap 214 described more fully below. A portion of shaft 210 proximal to head 202 and designated 206 is configured to have a diameter greater than the diameter of a distal end so as to provide a more robust supporting surface for piston spring 26' (shown in FIG. 52).

Formed within piston 200 is a piston channel 209 that extends from a top end of piston 200 to a point in close proximity to a tip of shaft 210. Channel 209 is open at the top end and terminates short of the shaft tip. A piston vent hole 208 is formed on shaft 210 proximal to a tip of shaft 210 and connects to, and is in fluid communication with channel 209. This configuration allows for fluid/pressure from inlet 304 to enter vent hole 208 travel through piston 200 and to exit from top 202 where the pressure counteracts the pre-set force provided by tension spring 26'.

A poppet 212 is dimensioned to fit with tight tolerances within poppet bore 310 sufficient to allow poppet 212 to move along bore 310 in response to pressure differentials created between inlet pressure and pressure exerted against piston 200. Poppet 212 includes a piston bore 216 dimensioned to receive the distal tip of piston shaft 210. Bore 216 is configured to allow fluid and pressure to enter vent hole 208 which is positioned within the body of poppet 212. A bottom surface of poppet 212 registers against valve seat 236 to provide an airtight seal when incoming pressure exceeds a pre-set force via spring 26'.

Referring now to FIGS. 69-73, a valve seat 236 is shown having a body 240 substantially circular in shape with valve seat threading 238 formed about the perimeter of seat 236. Threading 328 provides a means to secure valve seat 236 within inlet port 304 by mating with inlet port threading 306. A filter bore 242 is formed on a top end of seat 236 to receive filter 252. Filter 252 filters particulate matter from any fluids introduced into the regulator and prevents migration of the particulate matter past the inlet port. A slot 248 may be formed on the top end of seat 236 to facilitate mounting of the valve seat into inlet port 304.

Extending from a bottom end of seat 236 is a valve seat post 244. Post 244 is dimensioned fit within connector port 308 and to enter into poppet bore 310 when vale seat 236 is secured to a bottom of inlet port 304. A distal tip of post 244 registers against poppet 212 to provide an airtight seal when pressure introduced into the regulator exceeds a pre-determined limit provided by tension spring 26'. A valve seat bore 237, formed in post 244, connects to, and is in fluid communication with filter bore 242. Formed on a bottom surface of seat 236 is an annular valve seat channel 246 dimensioned to receive valve seat o-ring 250. O-ring 250 provides a seal between the bottom of valve seat 236 and a bottom of inlet port 304 when the valve seat is secured to the port.

Referring now to FIGS. 67 and 68, a piston cap 214 having a substantially cylindrical shape includes a piston bore 216 dimensioned to receive piston head 202 and piston o-ring 121' so as to allow free movement of piston 200 within cap 214. An annular cap flange 220 is formed on a bottom edge of cap 214 to provide a mounting means to secure the cap to regulator body 302. Flange 220 is structured with a close fitting outside diameter to eliminate the use of mechanical threading. This combined with a relatively loose tolerance of the inner diameter of piston nut 254 (described below), allows seal plate 222, piston 200 and piston cap 214 to self-align. With the level of precision required, the misalignment caused by threading having a 60° orientation relative to the plane occupied by the component walls is eliminated. A cap vent hole 218 is formed on a sidewall of cap 214 to allow the pressure within the cap to register against resident atmospheric pressure. Vent hole 218 also provides a pressure relief means if piston o-ring 121' should fail. If such should happen, pressure is released to the atmosphere.

To secure piston cap 214 and the enclosed piston assembly (piston 200, spring 26', and piston o-ring 121'), a piston nut 254 is provided as shown in FIGS. 74 and 75. Piston nut 254 is configured as a cylindrical ring having a segment of the cylindrical sidewall formed with piston nut threading 258 that engages matching threading formed within piston cap port threading 318. The remaining segment 256 of the sidewall is substantially smooth and uniform to slide freely within seal plate port 314. Segment 256 is dimensioned to allow a sufficient amount of play to enable the piston assembly to self-align. The inner-diameter of nut 254 is also dimensioned to allow a sufficient amount of play to enable the piston assembly to self-align. To assist in the assembly of nut 254 to regulator body 302, a top end the nut may be castellated (formed with substantially orthogonal slots 260), to provide an engagement surface for a torquing tool, e.g., a screwdriver.

Referring now to FIGS. 50 and 51, a banjo plug 190 is shown having a hexagonally shaped top 193 with a slot 198 formed in the top. The hexagonal shape and slot are each provided as engagement means for torquing tools, such as wrenches and screwdrivers. It should be understood plug 190 may be formed with any shape so long as a means is provided to secure plug 190 to regulator body 302. Extending from top 193 is banjo plug shaft 191. Shaft 191 has portions that define a banjo plug bore 194 that extends through a portion of shaft 191 and opens at a distal tip of the shaft. A banjo plug hole 192 is formed in the sidewall of shaft 191 and is in fluid communication with bore 194. Banjo plug threading 196 is formed on a distal end of shaft 191 to engage mating threads 343 formed on the walls of banjo plug port 341.

The purpose of plug 190 is to address a manufacturing issue involving the formation of connector channel 340 and third stage ball valve port 358. As the port and channel are set at a substantially orthogonal orientation within the body of the regulator, the connection is made via drilling from an outside wall of regulator body 302 to create a connecting channel, i.e., plug port 341. Plug 190 serves the purposes of closing off the connection from the exterior of regulator 302 while allowing for the flow of fluid and pressure from connector channel 340 through plug hole 192 into and through bore 194 and into third stage ball valve port 358.

Having described the components and features of Applicant's novel three-stage pressure regulator, a method of operation so as to regulate and reduce very high pressures to much lower pressures will now be described. To operate the regulator, fluid and/or gas is introduced into inlet 304 at a pressure ranging from about 1 psi to about 8000 psi. The fluid travels through filter 252 and into valve seat 236 via stem aperture 237. The fluid then travels through piston vent hole 208 into piston channel 209. The high pressure counters the force imparted on piston 200 by piston spring 26' so that piston 200 moves towards valve seat post 244.

If piston shaft 210 becomes engaged with valve seat post 244, the fluid flow will be arrested. The pressure of the fluid flowing out of post 244 combined with the axial force applied by spring 26' against piston 200, however, should always be slightly greater than the pressure realized in piston cavity 134' so that the first stage should always remain open. The configuration of the first stage allows for a substantial reduction in the initial pressure of the fluid from as much as about 3000 psi down to 200 or 300 psi, which is the pressure exerted on second stage ball 50' exclusive of the force exerted on ball 50' by second stage ball valve spring 52'.

Due to the configuration of the valve seat port, poppet port and second stage ball valve port, at the initial introduction of fluid into regulator 300, the full initial pressure is exerted against second stage ball valve 50' until the fluid has flowed through piston 200 and into cavity 134' where the pressure acts as a countervailing force to the pressure created by the incoming fluid. After the initial flow, the fluid pressure exerted on second-stage ball valve 50' is much reduced.

After the initial pressure adjustment, the fluid, flowing at a pressure greater than the pressure set for the second stage, urges second stage ball valve 50' away from second stage ball valve seat 48'. This allows the fluid to flow from poppet port 310 through connector port 322, through second stage ball valve port 324, through second stage ball valve seat 48', and into the lower tapered portion of second stage diaphragm chamber 330.

The second stage pressure is referenced against resident atmospheric pressure due to second stage vent bore 142', and is set by the combination of the force exerted by Bellville washers 40' against spring cup 42', and the force exerted upon the washers 40' by plunger 38', which is determined by the thickness of the plunger. As the second stage, in one embodiment, is not adjustable, the thickness of plunger 38' may be varied to achieve the desired pressure at which fluid exits the second stage. The force created by the combination of plunger 38' and washers 40' is transferred to second stage diaphragm 44'. Diaphragm 44' transfers the force to second stage valve actuator 46'. Valve actuator 46' registers against second stage ball valve 50' and urges it into a slightly open position to set the pressure at which fluid exits the second stage.

In the embodiment using a third-stage adjustable cap as a second stage cap, set screw 32' is adjusted to urge a desired pressure on plunger 38'. Again, the pressure is referenced against atmospheric pressure via vent bore 142'. That pressure is transmitted onto Bellville washers 40', which, in turn, exert the pressure onto spring cup 42'. The pressure is then transmitted to diaphragm 44', which urges valve actuator 46' against ball 50' so as to lower ball 50' to allow fluid and/or gas to exit second stage diaphragm chamber 330 at a controlled desired pressure. If the desired pressure is exceeded, ball valve 50' migrates towards, and registers against second stage valve seat o-ring 49' to seal off the fluid and/or gas from entering second stage diaphragm chamber 330.

Once the fluid and/or gas has entered chamber 330, the fluid and/or gas may be reduced to a pressure of from about 250 psi to about 40 psi and flows unimpeded into connector channel 340 and into and through banjo plug 190 via banjo plug hole 192 banjo plug bore 194. The fluid and/or gas next flows into third stage ball valve port 358 at substantially the same pressure experienced in the bottom portion of second stage diaphragm chamber 330.

The pressure exerted onto third stage ball valve 50" urges valve 50" toward third stage ball valve seat 48'". If the amount of pressure imparted by the fluid and/or gas on valve 50" exceeds the pre-set third stage pressure, valve 50" is urged toward, and registers with third stage valve seat o-ring 49" and prevents and further travel of the fluid and/or gas into the lower portion of the third stage diaphragm chamber 342.

To set the third stage pressure, set screw 32" is adjusted to urge a desired pressure on third stage plunger 38". That force is transmitted onto third stage Bellville washers 40", which, in turn, exert the force onto third stage spring cup 42". The pressure is referenced against resident atmospheric pressure via third stage vent bore 142". The force is then transmitted to third stage diaphragm 44', which urges third stage valve actuator 38' against third stage ball 50" so as to lower ball 50" to allow fluid and/or gas to flow into diaphragm port 88" into outlet channel 352 and outlet port 354 at a controlled and desired pressure. The third stage valve is capable of reducing pressure from about 40 psi to about 0.5 to 3 psi. Due to built-in hysteresis in the third stage, pressure may fluctuate from about 0.1 to about 0.15 psi. The final pressure of the fluid exiting the regulator is from about 0.5 to about 3 psi.

While the present disclosure has been described in connection with one or more embodiments thereof, it will be apparent to those skilled in the art that many changes and modifications may be made without departing from the true spirit and scope of the disclosure. Accordingly, it is intended by the appended claims to cover all such changes and modifications as come within the true spirit and scope of the disclosure.

Having thus described my disclosure, what I claim as new and desire to secure by United States Letters Patent is:

1. A three-stage pressure regulator comprising:
    a regulator body having portions defining a first valve chamber, a second valve chamber and a third valve chamber, wherein the first valve chamber is in fluid communication with the second valve chamber and wherein the second valve chamber is in fluid communication with the third valve chamber;
    a first-stage valve comprising a piston, wherein the piston comprises a piston head and a piston shaft wherein the piston has portions defining a piston channel open at a top end of the piston and wherein the piston has portions defining a piston hole formed on a sidewall of the piston shaft in fluid communication with the piston channel, a poppet housed in the first valve chamber, a piston cap secured to the regulator body first valve chamber with a piston nut secured to a wail of the first valve chamber, wherein the piston cap is superposed about the piston to create a piston gap;
    a second-stage valve comprising a diaphragm and a ball valve housed in the second valve chamber; and,
    a third-stage valve comprising a second diaphragm and a second ball valve housed in the third valve chamber.

2. The regulator of claim 1 wherein the piston head has portions defining a piston head channel about a perimeter of the piston head, wherein the regulator further comprises a piston o-ring positioned in the piston head channel, wherein the piston o-ring provides a seal between the piston head and the piston cap, wherein the piston head slides freely within the piston cap.

3. The regulator of claim 2 wherein the first-stage valve further comprises a seal plate secured to the first valve chamber wherein the seal plate has portions defining an o-ring channel, wherein a seal plate o-ring is positioned in the o-ring channel to provide a seal between the seal plate and the first valve chamber.

4. The regulator of claim 3 wherein the seal plate has portions defining a seal plate bore dimensioned to receive a second seal plate o-ring positioned in the bore wherein an orifice defined by the o-ring receives the piston shaft and creates a seal between the piston shaft and seal plate and wherein the piston shaft slides freely within the second seal plate o-ring.

5. The regulator of claim 4 wherein the regulator further comprises an inlet port in fluid communication with the first valve chamber and wherein the first-stage valve further comprises a valve seat wherein the valve seat is secured within the inlet port.

6. The regulator of claim 5 wherein the valve seat comprises a filter bore formed in a top surface, a filter secured in the filter bore, and a valve seat post configured to enter into the first valve chamber and register against the poppet when the first-stage valve is in a closed position, wherein the valve seat post has portions defining a valve seat bore in fluid communication with the filter bore and the first valve chamber.

7. The regulator of claim 6 further comprising a valve seat o-ring, wherein the valve seat has portions defining an annular valve seat channel to receive the valve seat o-ring to create a seal between the valve seat and the inlet port.

8. The regulator of claim 1 further comprising a second-stage body cap to enclose the second valve chamber.

9. The regulator of claim 1 further comprising a third-stage body cap to enclose the third valve chamber.

10. The regulator of claim 1 further comprising a second-stage connector port formed in the regulator body wherein the connector port is in fluid communication with the first valve chamber and the second valve chamber.

11. The regulator of claim 10 wherein the second valve chamber comprises a second-stage ball valve chamber and a second-stage diaphragm chamber wherein the ball valve and diaphragm chambers are in fluid communication.

12. The regulator of claim 11 wherein the second-stage valve comprises a second-stage ball valve, a second-stage ball valve spring registered against the ball valve, and a second-stage ball valve seat secured to the second ball valve chamber and registered against the second-stage ball valve.

13. The regulator of claim 12 wherein the second-stage valve further comprises a second-stage valve actuator having portions defining a second-stage valve actuator shaft that registers against the second-stage ball valve and wherein the valve actuator registers against the second-stage diaphragm.

14. The regulator of claim 13 wherein the second-stage valve further comprises a second-stage spring cup registered against the second-stage diaphragm and at least one Belleville washer registered against the spring cup.

15. The regulator of claim 14 wherein the second-stage valve further comprises a second-stage plunger registered against the at least one Belleville washer and secured within the second valve chamber with a second-stage body cap.

16. The regulator of claim 15 wherein the second-stage body cap further comprises portions defining a second-stage set screw bore for receiving a set screw.

17. The regulator of claim 16 wherein the second-stage valve further comprises a second-stage set screw secured to the second-stage body cap wherein an end of the set screw registers against the second-stage plunger.

18. The regulator of claim 1 further comprising a connector channel wherein the connector channel is in fluid communication with the second valve chamber and the third valve chamber.

19. The regulator of claim 18 wherein the regulator body further comprises a banjo plug port in fluid communication with the second valve chamber and the third valve chamber.

20. The regulator of claim 19 further comprising a banjo plug having a shaft wherein the shaft has portions defining a banjo plug bore opened at a distal end of the shaft and a banjo plug hole formed in a sidewall of the shaft and in fluid communication with the banjo plug bore.

21. The regulator of claim 20 wherein the third valve chamber comprises a third-stage ball valve chamber and a third-stage diaphragm chamber wherein the ball valve and diaphragm chambers are in fluid communication.

22. The regulator of claim 21 wherein the third-stage valve comprises a third-stage ball valve, a third-stage ball valve spring registered against the ball valve, and a third-stage ball valve seat and o-ring assembly secured to the third-stage ball valve chamber and registered against the third-stage ball valve.

23. The regulator of claim 22 wherein the third-stage valve further comprises a third-stage valve actuator having portions defining a third-stage valve actuator shaft that registers against the third-stage ball valve and wherein the valve actuator further registers against the third-stage diaphragm.

24. The regulator of claim 23 wherein the third-stage valve further comprises a third-stage spring cup having a first side registered against the third-stage diaphragm and at least one third-stage Belleville washer registered against an opposing second side of the spring cup.

25. The regulator of claim 24 wherein the third-stage valve further comprises a third-stage plunger registered against the at least one third-stage Belleville washer and secured within the third valve chamber with a third-stage body cap.

26. The regulator of claim 25 wherein the third-stage body cap further comprises portions defining a third-stage set screw bore for receiving a third-stage set screw.

27. The regulator of claim 26 wherein the third-stage valve further comprises a third-stage set screw secured to the third-stage body cap wherein an end of the set screw registers against the third-stage plunger.

* * * * *